US012137330B2

(12) United States Patent
Singh et al.

(10) Patent No.: US 12,137,330 B2
(45) Date of Patent: Nov. 5, 2024

(54) SYSTEM FOR INTELLIGENT AUDIO RENDERING USING HETEROGENEOUS SPEAKER NODES AND METHOD THEREOF

(71) Applicant: Samsung Electronics Co., Ltd., Suwon-si (KR)

(72) Inventors: Avinash Singh, Noida (IN); Nishchal Nishchal, Noida (IN); Hemanshu Srivastava, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/827,163

(22) Filed: May 27, 2022

(65) Prior Publication Data

US 2022/0386026 A1 Dec. 1, 2022

Related U.S. Application Data

(63) Continuation of application No. PCT/KR2022/007346, filed on May 24, 2022.

(30) Foreign Application Priority Data

May 24, 2021 (IN) ............................ 202111023022
Jul. 1, 2021 (IN) ............................ 2021 11023022

(51) Int. Cl.
*H04R 3/12* (2006.01)
*H04R 5/04* (2006.01)
*H04S 7/00* (2006.01)

(52) U.S. Cl.
CPC ................. *H04R 3/12* (2013.01); *H04R 5/04* (2013.01); *H04S 7/30* (2013.01)

(58) Field of Classification Search
CPC ................ H04R 3/12; H04R 5/04; H04S 7/30
(Continued)

(56) References Cited

U.S. PATENT DOCUMENTS 7,747,338 B2 6/2010 Korhonen
8,726,343 B1 5/2014 Borzycki et al.
(Continued)

FOREIGN PATENT DOCUMENTS

EP 3 675 508 A2 7/2020
KR 10-2017-0092407 A 8/2017
(Continued)

OTHER PUBLICATIONS

International Search Report and Written Opinion dated Aug. 22, 2022, issued in International Patent Application No. PCT/KR2022/007346.

(Continued)

*Primary Examiner* — William A Jerez Lora
(74) *Attorney, Agent, or Firm* — Jefferson IP Law, LLP

(57) ABSTRACT

A system for intelligent audio rendering using speaker nodes is provided. A source device determines a spatial location and speaker capability of one or more speaker nodes based on information embedded in a corresponding node of each of the one or more media devices, selects a first speaker most suitable for each audio channel based on the speaker capability and the spatial location of each of the one or more speakers, generates speaker profiles for the one or more speakers, maps an audio channel to each of the one or more speakers based on a speaker profile corresponding to each of the one or more speakers, estimates a media path between the source device and each of the one or more speakers, detects a change in the estimated media path, renders an audio on the one or more speakers based on the speaker profiles and the changes in the media paths corresponding to each of the one or more speakers in real-time.

17 Claims, 20 Drawing Sheets

(58) Field of Classification Search
USPC ...................... 381/56, 58, 59, 300, 303, 306
See application file for complete search history.

(56) References Cited

U.S. PATENT DOCUMENTS

| | | | |
|---|---|---|---|
| 9,338,208 B2 | 5/2016 | Rajapakse | |
| 9,582,242 B2 | 2/2017 | Jantunen et al. | |
| 10,341,771 B2 | 7/2019 | Park | |
| 10,609,484 B2 | 3/2020 | Family et al. | |
| 11,057,731 B2 | 7/2021 | Tsingos et al. | |
| 11,337,020 B2 | 5/2022 | Leppanen et al. | |
| 2008/0077261 A1* | 3/2008 | Baudino | H04M 1/72412 700/94 |
| 2010/0299639 A1 | 11/2010 | Ramsay et al. | |
| 2015/0098576 A1* | 4/2015 | Sundaresan | H04L 43/0894 381/58 |
| 2018/0139498 A1 | 5/2018 | Risberg et al. | |
| 2018/0182389 A1* | 6/2018 | Devaraj | H04L 51/224 |
| 2018/0367893 A1 | 12/2018 | Lin et al. | |
| 2020/0382892 A1 | 12/2020 | Mehta et al. | |

FOREIGN PATENT DOCUMENTS

| | | |
|---|---|---|
| WO | 2020/030303 A1 | 2/2020 |
| WO | 2020/124363 A1 | 6/2020 |
| WO | 2020/144062 A1 | 7/2020 |
| WO | 2020/247811 A1 | 12/2020 |

OTHER PUBLICATIONS

Global Soundbar Market Expected to Grow with a CAGR of 15% Over the Forecast Period, 2020-2024—ResearchAndMarkets.com, Apr. 3, 2020.

4K TV Market Size Worth $380.9 Billion by 2025, Jun. 2017.

Home Theatre Market Size, Share & Trends Analysis Report by Product, Home Theatre in a Box System, Sound Bar, by Distribution Channel, Offline, Online, by Region, and Segment Forecasts, 2019-2025, Aug. 2019.

Extended European Search Report dated May 10, 2024, issued in European Patent Application No. 22811608.3.

* cited by examiner

FIG. 11C

1100C

| | | |
|---|---|---|
| AP Connection between the Devices | 2.4GHz | |
| No. Of Speakers connected with TV1 | 5 | |
| Banwidth used by Speakers | No. Of Spekaers Bandwidth used by on | 5 X 640Kbps = 3.125 Mbps |
| Devices connected with Access Point | 5 Spkears + 5 TV's | |
| DLNA Playback Bandwidth between TV2 and TV3 | | 2 Mbps |
| DLNA Playback Bandwidth between TV4 and TV5 | | 3 Mbps |

| Buffer Ratio = Qa[N]/Qe[N] | | | | |
|---|---|---|---|---|
| Speaker 1 | Speaker 2 | Speaker 3 | Speaker 4 (Left) | Speaker 5 (Right) |
| 0.24814 | 0.09066 | 0.16584 | 0.11074 | 0.14225 |
| 0.19802 | 0.11050 | 0.14184 | 0.12422 | 0.12422 |
| 0.19231 | 0.12195 | 0.10870 | 0.09804 | 0.10870 |
| 0.21978 | 0.08658 | 0.11696 | 0.08658 | 0.10471 |
| 0.16502 | 0.11038 | 0.14164 | 0.09940 | 0.09372 |
| 0.12579 | 0.09132 | 0.10050 | 0.06270 | 0.08368 |
| 0.12469 | 0.08319 | 0.16504 | 0.09074 | 0.09980 |
| 0.09166 | 0.09083 | 0.09515 | 0.09794 | 0.08123 |
| 0.08889 | 0.09804 | 0.06929 | 0.09756 | 0.09804 |
| 0.08937 | 0.09217 | 0.09950 | 0.09569 | 0.08368 |

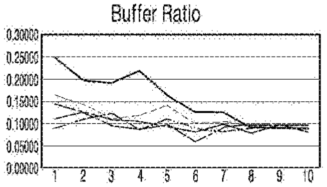

⇩

Speakers report their Buffer Levels to TV when the Buffer Ratio <10%(0.10) [Audio Drops]
TV will decide to move some speakers back to Speakers and remove some speakers from Wifi Speaker Profile to gain the Network bandwidth for Audio streaming.
In Below case WiFi Speakers were moved TV Spekares to gain Network Bandwidth

| Buffer Ratio = Qa[N]/Qe[N] | | |
|---|---|---|
| Speaker 1 | Speaker 2 | Speaker 3 (Right) |
| 0.49261 | 0.44130 | 0.34123 |
| 0.48780 | 0.37453 | 0.47453 |
| 0.31250 | 0.44444 | 0.34444 |
| 0.39216 | 0.34843 | 0.44843 |
| 0.48544 | 0.45249 | 0.45249 |
| 0.33898 | 0.36101 | 0.36101 |
| 0.49505 | 0.44248 | 0.44248 |
| 0.49751 | 0.41322 | 0.43536 |
| 0.45455 | 0.34364 | 0.44364 |
| 0.48780 | 0.42553 | 0.43535 |

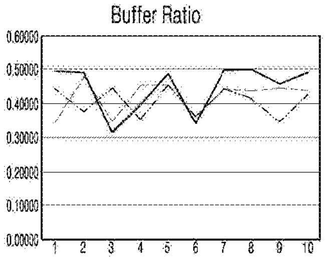

| | | |
|---|---|---|
| AP Connection between the Devices | 2.4GHz | |
| No. Of Speakers connected with TV1 | 3 | |
| Banwidth used by Speakers | No. Of Spekaers Bandwidth used by on | 3 X 640Kbps = 1.875 Mbps |
| Devices connected with Access Point | 3 Spkears + 5 TV's | |
| DLNA Playback Bandwidth between TV2 and TV3 | | 2 Mbps |
| DLNA Playback Bandwidth between TV4 and TV5 | | 3 Mbps |

FIG. 16

1600

1600A

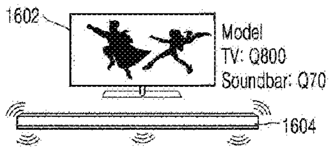

TV with Soundbar (Audio on Soundbar)

| TV Speaker node capabilities | |
|---|---|
| Number Of Speakers | 4 |
| Speaker Position, Frequency Response | Front Left, 200Hz~12KHz<br>Front Right, 200Hz~12KHz<br>Top, 80Hz~120Hz |
| Post Processing Capabilities | List of Post processes supported along with Post Processing Delays |

- User is watching movies on TV and Soundbar connected
- As DTV is connected with soundbar and only soundbar audio is played
- TV speakers are not used.
- Audio channel are mapped statically on soundbar

1600B

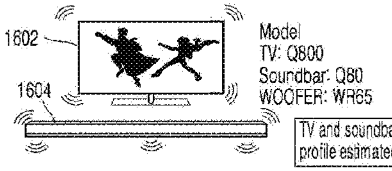

TV and soundbar speaker node's capabilities calculated and speaker profile estimated to provide immersive audio effect.

TV with Soundbar (Audio on TV and Soundbar)

| Soundbar Speaker node capabilities | |
|---|---|
| Number Of Speakers | 4 |
| Speaker Position, Frequency Response, RSSI | Left, 80Hz~16KHz, RSSI Value<br>Center, 200Hz~16KHz, RSSI Value<br>Right, 80Hz~16KHz, RSSI Value<br>Surround, 40~120KHz, RSSI Value<br>Right Surround, 40~120KHz, RSSI Value |
| Post Processing Capabilities | List of Post processes supported along with Post Processing Delays |

- User is watching movies on TV and Soundbar connected
- As DTV is connected with soundbar and dynamic speaker profile is used
- Based on speaker profile both TV and Soundbar speaker used
- Audio channel are mapped dynamically on TV and soundbar Audio Output on TV+Soundbar speaker

| Speaker | Use TV sPEAKER | Use Sound Bar Speaker |
|---|---|---|
| Front Left | O | × |
| Front Right | O | × |
| Center | × | O |
| Surround Left | × | O |
| Surround Right | × | O |
| Top | O | × |
| Left | × | O |
| Right | × | O |
| Woofer | × | × |

FIG. 17

1700

1700A

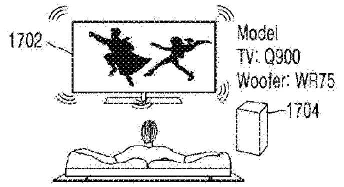

| TV Speaker node capabilities | |
|---|---|
| Number Of Speakers | 6 |
| Speaker Position, Frequency Response | Front Left, 200Hz~12KHz<br>Front Right, 200Hz~12KHz<br>Top Left, 80Hz~120Hz<br>Top Right, 80Hz~120Hz<br>Center, 80Hz~16Hz<br>Woofer, 60Hz~100Hz |
| Post Processing Capabilities | List of Post processes supported along with Post Processing Delays |

- User is watching movies on TV
- External Woofer is available but currently only TV woofer is used
- Audio is render on TV speaker and Woofer
- Audio ichannel are mapped TV speaker and Woofer

1700B

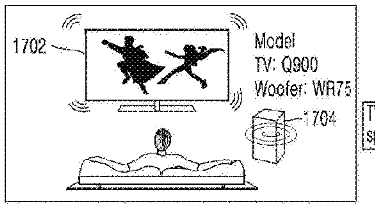

| Soundbar Woofer node capabilities | |
|---|---|
| Number Of Speakers | 5 |
| Speaker Position, Frequency Response, RSSI | Woofer, 31.5~120KHz |
| Post Processing Capabilities | List of Post processes supported along with Post Processing Delays |

- User is watching movies on TV
- External Woofer is available and TV detects Woofer
- External Woofercapability is higher than Inbulit Woofer
- Audio channel are mapped TV speaker and external Woofer according to capability TV and soundbar speaker node's capabilities calculated and speaker profile estimated to provideimmersive audio effect.

Audio Output on TV+Soundbar speaker

| Speaker | Use TV Speaker | Use Sound Bar Woofer |
|---|---|---|
| Front Left | O | × |
| Front Right | O | × |
| Center | O | × |
| Surround Left | × | × |
| Surround Right | × | × |
| Top | O | × |
| Left | × | × |
| Right | × | × |
| Woofer | × | O |

FIG. 18

1800

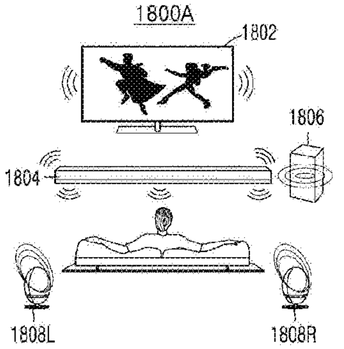

- User is watching movies on TV, Soundbar and rear speakers are connected using Wi-Fi network
- Audio is played on TV speakers as Sound Bar and Rear speakers.
- Audio is render on TV speaker and Woofer being played on rear speakers connected with Wi-Fi.
- User enjoying the Audio on the speakers which matches the Audio content capability.

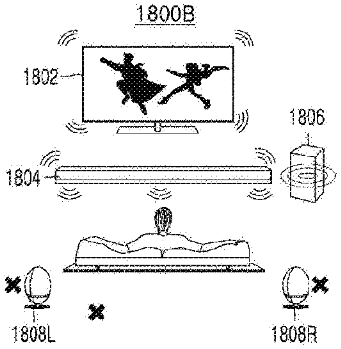

TV and soundbar speaker node's capabilies calculated and speaker profile estimated to provide immersive audio effect.

- User is watching movies on TV, Soundbar and rear speaker are connected using Wi-Fi network
- Audio is played on TV speakers as well as Sound Bar and Rear speakers.
- The network is good and the Rea surround (L/R) are being played on rear speakers connected with Wi-Fi.
- The network experiences congestion or interference, this leads to Audio drops on all speakers. To reduce congestion rear speakers are removed from the Speaker configuration.
- The Rear surround (L/R) are moved to TV Speakers.
- User keeps enjoying the Audio on the speakers which matches the Audio content capability.

Initial Audio Output on TV+Soundbar speaker + Speaker

| Speaker | TV | Soundbar | Speaker1 | Speaker2 |
|---|---|---|---|---|
| Front Left | O | × | × | × |
| Front Right | O | × | × | × |
| Center | O | × | × | × |
| Surround Left | × | × | × | × |
| Surround Right | × | × | × | × |
| Top | O | × | × | × |
| Left | × | × | × | × |
| Right | × | × | × | × |
| Woofer | × | O | × | × |
| Rear Left | × | × | O | × |
| Rear Right | × | × | × | O |

Audio Output in case of poornetwork on TV+Soundbar speaker + Speaker

| Speaker | TV | Soundbar | Speaker1 | Speaker2 |
|---|---|---|---|---|
| Front Left | O | × | × | × |
| Front Right | O | × | × | × |
| Center | O | × | × | × |
| Surround Left | × | × | × | × |
| Surround Right | × | × | × | × |
| Top | O | × | × | × |
| Left | × | × | × | × |
| Right | × | × | × | × |
| Woofer | × | O | × | × |
| Rear Left | O | × | × | × |
| Rear Right | O | × | × | × |

SYSTEM FOR INTELLIGENT AUDIO RENDERING USING HETEROGENEOUS SPEAKER NODES AND METHOD THEREOF

CROSS-REFERENCE TO RELATED APPLICATION(S)

This application is a continuation application, claiming priority under § 365(c), of an International application No. PCT/KR2022/007346, filed on May 24, 2022, which is based on and claims the benefit of an Indian Provisional patent application number 202111023022, filed on May 24, 2021, in the Indian Intellectual Property Office, and of an Indian Complete patent application number 202111023022, filed on Jul. 1, 2021, in the Indian Intellectual Property Office, the disclosure of each of which is incorporated by reference herein in its entirety.

TECHNICAL FIELD

The disclosure relates to media devices and particularly to rendering audio on speakers.

BACKGROUND

Media devices such as televisions (TVs), smart monitors, speakers, sound bars etc. are commonly used in office spaces and households. The popularity and usage of smart TVs and home theatres has grown significantly in the U.S. in past decade and is projected to further increase in coming years. The media devices provide immersive audio experience to users by way of three dimensional (3D) audio that uses multiple speakers. In multi-device systems, each media device has speakers of different capabilities. Multi-channel audio content provides better experience when rendered on a speaker having special capabilities. For each multimedia scene played on the media device, audio and video objects in the scene can be analyzed and encoded in a special way to provide enhanced user experience. The TVs and sound bars are specially located on different places to provide 3D audio.

In the media devices, more speakers provide more realistic and immersive sound effects. However, using large number of speakers increases bandwidth usage. It is also challenging to provide audio signals to large number of speakers. While transferring audio signals to speakers, a number of devices and network environments are major constraints. Therefore, certain mechanisms are required to provide the audio signals to the speakers connected to the media devices.

Samsung® Q-Symphony uses TV and sound bar speakers to provide immersive sound effect. The Q-Symphony uses static speaker configuration and does not fully realize multi-service speakers' capabilities. For instance, the woofer, tweeter, mid-range, and full-range speakers' capabilities are not realized at the fullest extent. Better user experience is provided by playing sound on specialized speakers. Each specialized speaker has a different frequency response and provides better sound experience as per the frequency response.

FIG. 1 depicts a media system (100) that includes a TV speaker system (102) and a sound bar speaker system (104) according to the related art.

Referring to FIG. 1, the TV speaker system (102) includes two top speakers (106*a* and 106*b*), a tweeter (108), and two mid woofers (110*a* and 110*b*). The sound bar speaker system (104) includes a sub-woofer (112) and rear speakers (114).

Day by day, TVs are becoming thinner along with the speaker designs for the thin TVs. The speakers (106*a*, 106*b*, 108, 110*a*, 110*b*) of the TV speaker system (102) have limited capabilities and hence, it is difficult to produce high quality multi-dimensional sound using the TV speakers (106*a*, 106*b*, 108, 110*a*, 110*b*). One way of possibly producing high quality multi-dimensional sound is using multi-device speaker configuration. In such case, Q-Symphony uses the TV speakers (106*a*, 106*b*, 108, 110*a*, 110*b*) and external speakers such as the sound bar speakers (112, 114) but does not realize the multi-device speaker capability to its fullest extent. The media systems suffer from drawbacks like (i) inefficient utilization of speaker, (ii) fixed speakers used in the TVs and sound bars, and (iii) lack of immersive effect using TV and sound bar according to the related art.

Recently, there is an increase in use of the sound bars with TVs. The number of speakers in the TVs has also increased. When both, the TV speakers (106*a*, 106*b*, 108, 110*a*, 110*b*) and the sound bar speakers (112, 114) are used together, not all the speakers are used efficiently. Further, every model of TV and sound bar has different speaker configuration. In some cases, the TV speakers (106*a*, 106*b*, 108, 110*a*, 110*b*) produce good quality audio in some audio frequency range and in other cases, the sound bar speakers (112, 114) produce better sound effect. Presently, the speakers are used based on fixed audio frequency ranges, i.e., the mid-range audio frequencies are played on the TV speakers (106*a*, 106*b*, 108, 110*a*, 110*b*) and the low-range and high-range audio frequencies are played on the sound bar speakers (112, 114). To provide immersive experience, a speaker having all audio frequency ranges is desired. The speaker systems provide limited speakers based on the multi-device speaker availability according to the related art. Using static speaker allocation does not result into immersive experience.

U.S. Pat. No. 9,338,208B2 relates to common event-based multi-device media playback. Here, a method for event-based synchronized multimedia playback between source and destination devices is provided. It focuses on synchronized payback in multi-device environment. It focuses on device timing synchronization using event and timestamp. However, the method does not provide multi-device speaker capability and dynamic speaker profile.

U.S. Pat. No. 9,582,242B2 relates to method and apparatus for creating a multi-device media presentation. Here, an approach is provided for multi-device media presentation for devices. One or more neighboring devices are detected and media presentation capabilities of the one or more neighboring devices are determined, and group is formed. However, device capability to reproduce contents media properties is not provided.

U.S. Pat. No. 8,726,343B1 relates to managing dynamic policies and settings in an orchestration framework for connected devices. This approach allows multiple devices to function as a coherent whole, allowing each device to take on distinct functions that are complementary to one another. However, the policies do not consider multimedia contents and its property-based profile generation.

U.S. Pat. No. 7,747,338B2 relates to audio system employing multiple mobile devices in concert. Here, a method for audio reproduction system for mobile devices to execute instructions and enabling contemporaneous play of the audio data file by the plurality of mobile devices is provided. However, the method does not include multi-device speaker capability and dynamic speaker profile.

Therefore, there is a need for an efficient multi-device and multi-speaker audio system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for rendering audio by a source device to one or more connected media devices and a media system thereof. This summary is neither intended to identify essential features of the disclosure nor is it intended for use in determining or limiting the scope of the disclosure.

Additional aspects will be set forth in part in the description which follows and, in part, will be apparent from the description, or may be learned by practice of the presented embodiments.

In accordance with an aspect of the disclosure, a method for rendering audio by a source device to one or more connected media devices is provided. The method includes determining a spatial location and speaker capability of one or more speakers in each media device based on information embedded in a corresponding node of the media device by a speaker capability propagation module. The method further includes selecting a best speaker for each audio channel based on the speaker capability and the spatial location of each of the one or more speakers by a best speaker estimation module. The method further includes generating speaker profiles for the one or more speakers by a speaker profile generation module. The method further includes mapping an audio channel to each of the one or more speakers based on a speaker profile corresponding to each of the one or more speakers by the speaker profile generation module. The method further includes estimating a media path between the source device and each of the one or more speakers by a media propagation path estimation module. The method further includes detecting a change in the estimated media path by a user and system environment change detection module. The method further includes dynamically rendering an audio on the one or more speakers by a media renderer module based on the speaker profiles and the changes in the media paths corresponding to each of the one or more speakers in real-time.

In accordance with another aspect of the disclosure, a media system is provided. The media system includes one or more media devices and a source device. Each media device has one or more speakers configured to play an audio. The source device is in communication with the media devices. The source device includes a speaker capability propagation module, a best speaker estimation module, a speaker profile generation module, a media propagation module, a user and system environment change detection module, and a media renderer module. The speaker capability propagation module is configured to determine a spatial location and speaker capability of one or more speakers in each media device based on information embedded in a corresponding node of the media device. The best speaker estimation module is configured to select a best speaker which is most suitable for each audio channel based on the speaker capability and the spatial location of each of the one or more speakers. The speaker profile generation module is configured to generate speaker profiles for the one or more speakers and map an audio channel to each of the one or more speakers based on a speaker profile corresponding to each of the one or more speakers. The media propagation path estimation module is configured to estimate a media path between the source device and each of the one or more speakers. The user and system environment change detection module is configured to detect a change in the estimated media path. The media renderer module is configured to dynamically render the audio on the one or more speakers based on the speaker profiles and the changes in the corresponding media paths in real-time.

In an embodiment, the node of the media device is accessible to the source device and other media devices connected in an environment.

In an embodiment, the speaker profile generation module compares a frequency response of a speaker of the source device and a frequency response of a speaker of the media device with a reference frequency of the audio. The speaker profile generation module selects the speaker of the source device when the frequency response of the speaker of the source device is nearer to the reference frequency of the audio. The speaker profile generation module selects the speaker of the media device when the frequency response of the speaker of the media device is nearer to the reference frequency of the audio.

In an embodiment, a dynamic media path estimation module extracts new bitrate of the audio when the user and system environment change detection module detects a change in bitrate of the audio. The dynamic media path estimation module determines whether the speaker mapped to the audio supports the new bitrate of the audio. The dynamic media path estimation module searches for a speaker that supports the new bitrate upon detecting that the speaker mapped to the audio does not support the new bitrate.

In an embodiment, the media renderer module dynamically renders the audio to the speaker that supports the new bitrate.

In an embodiment, the user and system environment change detection module detects a change in spatial location of a speaker.

In an embodiment, the media propagation path estimation module determines whether a Received Signal Strength Indicator (RSSI) value of the speaker is within a predefined threshold RSSI value.

In an embodiment, the speaker profile generation module updates the speaker profile of the speaker upon detecting that the RSSI value of the speaker is not within the predefined threshold RSSI value.

In an embodiment, the media renderer module dynamically renders the audio to the speaker based on the updated speaker profile.

In an embodiment, the media renderer module retrieves a list of post processes supported by the media devices, upon detecting a change in a sound mode of the source device. The media renderer module determines whether current post processes are supported by the media devices in the sound mode. The media renderer module determines when post processing delays on the media devices are of same order, upon determining that the current post processes are supported by the speakers. The media renderer module identifies the supported post processes to be applied on the media devices, upon determining that the current processes are not supported by the media devices. The media renderer module selects one or more speakers of the media devices supporting the current post processes in the sound mode with least processing delays. The media renderer module updates the speaker profiles of the selected speakers. The media renderer module dynamically renders the audio on the selected speakers in the sound mode based on the updated speaker profiles.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF ACCOMPANYING DRAWINGS

Reference will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments.

The above and other aspects, features, and advantages of certain embodiments of the disclosure will be more apparent from the following description taken in conjunction with the accompanying drawings, in which:

FIG. 11C illustrates an experimental result for dynamic media path estimation according to an embodiment of the disclosure;

FIG. 16 illustrates a first use case of the media system according to an embodiment of the disclosure;

FIG. 17 illustrates a second use case of the media system according to an embodiment of the disclosure; and FIG. 18 illustrates a third use case of the media system according to an embodiment of the disclosure.

Figure 1:
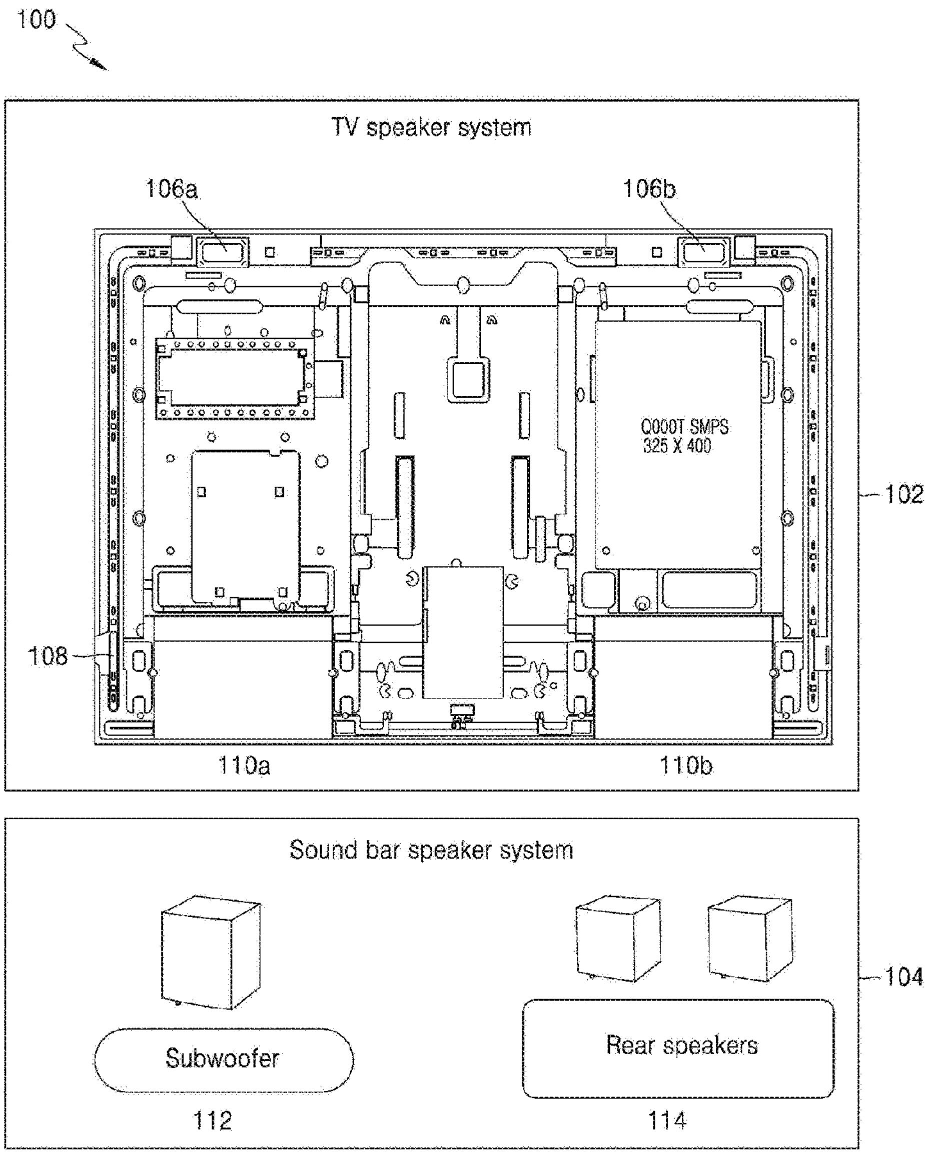
FIG. 1 illustrates a media system including a TV speaker system and a sound bar speaker system according to the related art.

It should be appreciated by those skilled in the art that any block diagram herein represents conceptual views of illustrative systems embodying the principles of the disclosure. Similarly, it will be appreciated that any flow chart, flow diagram, and the like represent various processes which may be substantially represented in computer readable medium and so executed by a computer or processor, whether or not such computer or processor is explicitly shown.

Throughout the drawings, like reference numerals will be understood to refer to like parts, components, and structures.

DETAILED DESCRIPTION

The embodiments herein provide a method for rendering audio by a source device to one or more connected media devices and a media system thereof The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, structures and devices shown in the figures are illustrative of various embodiments of the disclosure and are meant to avoid obscuring of the disclosure.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor(s) to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Throughout this application, with respect to all reasonable derivatives of such terms, and unless otherwise specified (and/or unless the particular context clearly dictates otherwise), each usage of "a" or "an" is meant to be read as "at least one" and "the" is meant to be read as "the at least one."

An embodiment of the disclosure provides a system for intelligent audio rendering using heterogeneous speaker nodes. The system includes a source device connected to one or more devices. The source device is configured to estimate connected devices' heterogeneous speaker capabilities based on embedded device node information. The source device is configured to estimate a dynamic media propagation path based on system and user environment conditions to generate media rendering profile for the connected devices. The source device is configured to use the media rendering profile to render media content on the connected devices to provide immersive experience.

Another embodiment of the disclosure provides a method for intelligent audio rendering using heterogenous speaker nodes. The method includes detecting at least one speaker's capability information and node information by a source device. The method includes selecting a best speaker based on the capability information and node information. The method includes generating a speaker profile using said capability information and said node information and audio channel mapping information. The method includes estimating media propagation path based on at least one of content, system, the media device, and user configuration information. The method includes calculating change in media propagation based on at least one of user environment and an addition of a new device. The method includes updating the speaker profile based on change in media propagation path.

The system and method for intelligent audio rendering using heterogenous speaker nodes of the disclosure broadly includes four steps: (i) dynamic device capability propagation, (ii) dynamic speaker profile generation, (iii) processing, and (iv) rendering of media.

In step (i), dynamic device capability propagation, media devices search nearby devices using available connectivity medium (i.e., Wireless Fidelity (Wi-Fi), Bluetooth (BT), High-Definition Multimedia Interface (HDMI), digital input (D-in)). Once a device is detected the media device retrieves device speaker capability and position information from the detected device. The device stores speaker capability information in a node and is accessible to all devices in same environment. Once a new device is added or an existing device in the same environment is removed, the device capability is added or removed from the node, respectively.

The source device calculates position of the media devices and estimates best possible rendering mechanism with available connection medium, device position and capability of the speakers. The source device also estimates the dynamic media content and channels and changes speaker configuration to provide better dialog delivery and immersive experience. The source device changes audio speaker channel based on learned channel mapping technique. When setting up a surround sound system, the first number defines the number of main speakers, the second number defines the number of sub-woofers, and the third number defines the number of 'height' speaker. Thus, 2.1 channel surround system means two main speakers placed in right and left position with 1 sub-woofer. The 7.1.2 channel surround system means a 7.1 surround sound setup (usually, 3 center speakers, 2 left speakers and 2 right speakers with 1 sub-woofer) with the addition of two ceiling or upward-firing speakers.

In step (ii), dynamic speaker profile generation, an audio controller of the source device retrieves the details of the connected devices model and device ID of the media devices. The audio controller retrieves the speaker's node capabilities, configuration, position, and connection details of the media devices using model and device ID. The source device estimates dynamic media propagation path based on system and user environment conditions to generate media rendering profile. Media rendering profile is used by the source device to render media content on connected devices, provide immersive experience, and estimate audio path for multichannel audio. The source device generates the dynamic speaker profile which may be used in preferred connection type. Each device has specific speakers based on frequency range of audio. Each speaker's properties and capability may be saved with their device ID. Table 1 illustrates an example of the speaker profile which includes the channel mapping based on the speaker position (spatial position).

TABLE 1

| Source Device Speaker Profile | Item |
|---|---|
| Model | TV Model Information |
| Number of speakers | 7 |
| Speaker Position/Frequency Response | Left/200 Hz~12 kHz<br>Center/80 Hz~16 kHz<br>Right/200 Hz~12 kHz<br>Top/80 Hz~120 Hz<br>Side/80 Hz~120 Hz<br>Woofer/60 Hz~100 Hz |
| Post Processing capability | List of post processes supported with post processing delays |

Table 2 illustrates another example of an audio node speaker profile when at least one sound bar speaker is included in a set of speakers.

TABLE 2

| Audio Node Speaker Profile | Item |
|---|---|
| Model | Sound Bar Speaker Model Information |
| Number of speakers | 9 |
| Speaker Position/Frequency Response with RSSI value | Left/80 Hz~16 kHz, RSSI value<br>Center/200 Hz~16 kHz, RSSI value<br>Right/80 Hz~16 kHz, RSSI value<br>Surround Left/40~120 Hz, RSSI value<br>Surround Right/40~120 Hz, RSSI value<br>Top/40 Hz~120 Hz, RSSI value<br>Side/40 Hz~120 Hz, RSSI value<br>Woofer/31.5 Hz~120 Hz, RSSI value |
| Post Processing capability | List of post processes supported with post processing delays |

Table 3 illustrates an example of the best speaker selection based on the individual speaker capability of Table 1 and Table 2.

TABLE 3

| Speaker Spatial Position | Use TV Speaker | Use Sound Bar Speaker |
|---|---|---|
| Left (Front) | X | ○ |
| Right (Front) | X | ○ |
| Center | ○ | X |
| Surround Left | X | ○ |
| Surround Right | X | ○ |

TABLE 3-continued

| Speaker Spatial Position | Use TV Speaker | Use Sound Bar Speaker |
|---|---|---|
| Top (L/R) | X | ○ |
| Side (L/R) | X | ○ |
| Woofer | X | ○ |

The speaker profile according to Table 3 is used to select the best speakers to render specific media which has 7.1.2 audio channels. The channel mapping may be changed based on the medial audio channel information and some of the channels may be put to "No Use (X)" as shown in Table 3. When audio media with channel configuration 5.1, this speaker profile may be updated as Table 4 below.

TABLE 4

| Speaker Spatial Position | Use TV Speaker | Use Sound Bar Speaker |
|---|---|---|
| Left (Front) | X | ○ |
| Right (Front) | X | ○ |
| Center | ○ | X |
| Surround Left | X | ○ |
| Surround Right | X | ○ |
| Top (L/R) | X | X |
| Side (L/R) | X | X |
| Woofer | X | ○ |

In step (iii), processing, once media contents decoding starts, a content detection module gets information about parameters of the content. The content detection module provides content information to channel mapping module which optimizes the content parameters based on the speaker profile. The content detection module may also modify the content parameters based on objects detected in the scene. The connection module also detects the preferred connection and optimizes media parameters as per the connection. It also estimates the connection path latency and provides synchronization parameters details to the synchronization module.

In step (iv), rendering of media, based on channel mapping module output, the rendering module retrieves channel details mapped to each device. It also retrieves the time-stamp or delay information from each local or remoted devices to render the media on each device synchronously. The channel details may include audio channel information present in the content. For example, audio content can be of 5.1 channel configuration for a selected media type and this channel configuration can be changed to 7.1.2 when a different media type is selected on the source device (202). The synchronization module included in the source device (202) may uses post processing delays which are a port of speaker capability to generate time stamps so that audio content can be rendered at the same time on internal speakers and external speakers.

Figure 2:
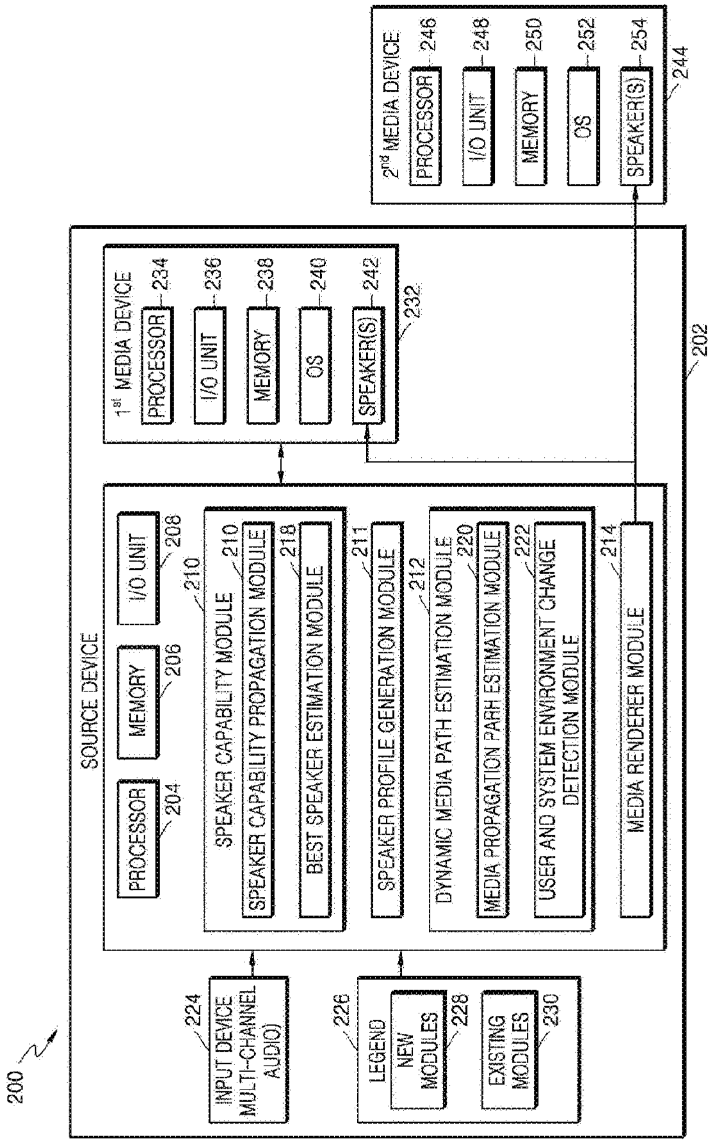
FIG. 2 illustrates a media system according to an embodiment of the disclosure.

FIG. 2 illustrates a media system in according to an embodiment of the disclosure.

Referring to FIG. 2, a media system (200) is illustrated in accordance with an implementation of the disclosure. The media system includes a source device (202). The source device (202) includes a processor (204), a memory (206), an Input/Output (I/O) unit (208), a speaker capability module (210), a speaker profile generation module (211), a dynamic media path estimation module (212), and a media renderer module (214). The speaker capability module (210) includes a speaker capability propagation module (216) and a best speaker estimation module (218). The dynamic media path estimation module (212) includes a media propagation path estimation module (220) and a user and system environment change detection module (222). The source device (202) includes an input device (224) which provides a multi-channel audio input. The source device (202) includes a legend (226) including new modules (228) and existing modules (230). The source device (202) includes a first media device (232). The first media device (232) includes a processor (234), an I/O unit (236), a memory (238), an operating system (OS) (240) and one or more speakers (242). The source device (202) is connected to a second media device (244). The second media device (244) includes a processor (246), an I/O unit (248), a memory (250), an OS (252), and one or more speakers (254).

The memory (206) stores computer-readable instructions which when executed by the processor (204) cause the processor to execute the method of audio intelligent rendering of the disclosure. In an embodiment, the processor (204) is specifically configured to perform the method of intelligent audio rendering of the disclosure. In an embodiment, the processor (204) is configured to execute the modules (210-222) of the source device (202).

The I/O unit (208) includes, but is not limited to, electronic antennas, Ethernet ports, optical fiber ports, Wi-Fi/Bluetooth/NFC transceivers, etc. The I/O unit (208) may also include touchscreens, remote controllers, voice activated controls, etc. The I/O unit (208) connects the source device (202) with the second media device (244) by way of wired/wireless communication networks. Examples of the wired/wireless communication networks include, but are not limited to LAN, optical fiber, Bluetooth, Wi-Fi, and mobile networks such as LTE, LTE-A, 5G, etc.

In an example, the source device (202) is a TV, and the second media device (244) is a sound bar. The source device (202) and the second media device (244) may be connected by wired and/or wireless connections such as Bluetooth, Wi-Fi, auxiliary port (AUX) cable, HDMI cable or optical fiber etc. In an example, the second media device (244) device may include one or more devices, such as sound bars, external speakers, etc.

The speaker capability module (210) retrieves the speaker information from each connected device (232, 244) such as the TV (202) and the sound bar (244). The speaker capability propagation module (216) retrieves audio capability details and speaker information embedded in device node which is accessible to all connected devices to know speaker capability details. The best speaker estimation module (218) analyzes each speaker's capability (woofer, tweeter, midrange, full range) and spatial position in each device (Left, Center, Right, Left side, Right side, Top, Side) based on the capability of each speaker on different devices. The best speaker estimation module (218) chooses the best speaker based on the audio channel The speaker capability details may include, but are not limited to, speaker frequency responses—e.g., whether the speaker can be used as woofer—supporting woofer sound frequency range of 50 Hz up to 1,000 Hz, as tweeter—supporting tweeter sound frequency range of 2,000 Hz up to 20,000 Hz, as midrange speaker covering frequency range of 250 Hz to 2,000 Hz, and as a full range speaker covering full range frequency. The speaker capability details may be further explained referring to FIG. 7. Across the specification, the speaker capability, the speaker capability information, the speaker capability details and the speaker information are used as the same terminology.

The speaker profile generation module (211) generates a speaker profile for master media device based on audio channel mapping and the selected speaker. The speaker profile generation module (211) creates the speaker profile with channel mapping and speaker information.

The dynamic media path estimation module (212) transmits each channel of audio to local and remote devices based on a user configuration and the speaker profile. In case of change in user environment or wired/wireless medium abnormalities, media path is dynamically changed to adjust abnormalities and provide better experience.

The media renderer module (214) retrieves the media and speaker profile information. The media render module (214) renders audio of channels to local media devices and remote media devices based on the respective speaker profiles and available speaker nodes. The media renderer module (214) obtains timestamp information or delay information to synchronize the local and remote device audio playback.

Figure 3:
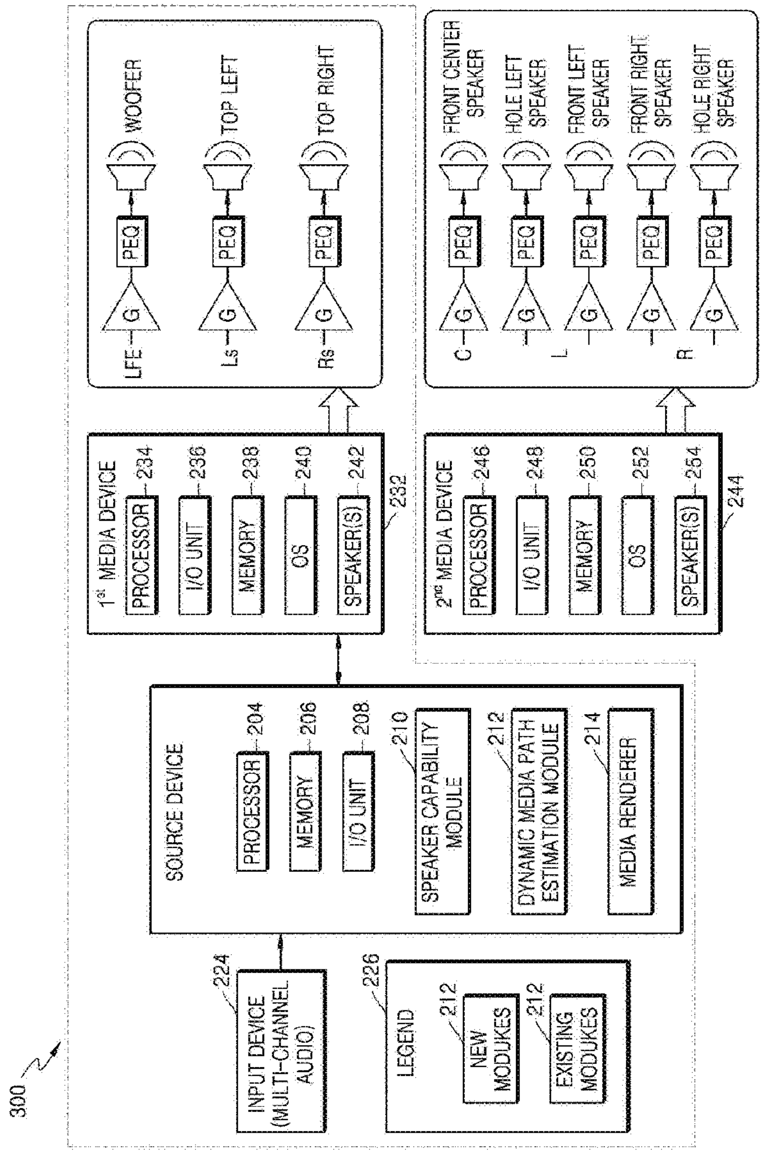
FIG. 3 illustrates a detailed architecture of a media system in according to an embodiment of the disclosure.

FIG. 3 shows a detailed architecture of the media system (200) of FIG. 2 according to an embodiment of the disclosure. FIG. 3 depicts media renderer and speaker configuration details for a given case.

In this case, the TV (300) has three speaker nodes (woofer, top left, and top right) and the sound bar (244) has five speaker nodes. The TV (300) selects the TV speakers (242) and/or the sound bar speakers (254) based on capabilities of the TV speakers (242) and the sound bar speakers (254). The TV (300) generates the speaker profiles.

After selection of media path by the dynamic media path estimation module (212), each audio channel is rendered on the TV speakers (242) and/or the sound bar speakers (254). The low-frequency effects (LFE) audio as well as the Ls and Rs channel audio are rendered on the TV speakers (242) and the center, left, and right channel audio are rendered on the sound bar speakers (254).

When a new external device is connected in the environment, the speaker profile generation module (211) generates a speaker profile for the new device based on a channel capability and the media renderer module (214) renders audio as per the speaker profile of the new device.

Figure 4:
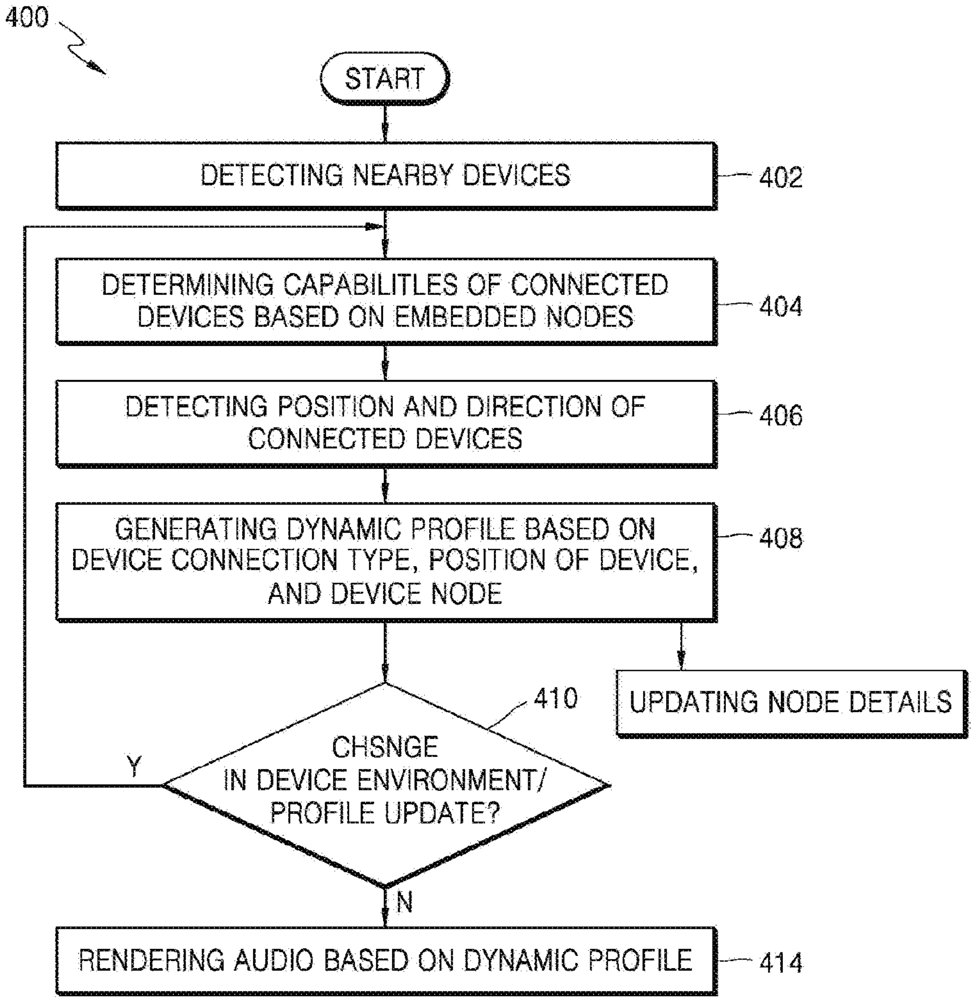
FIG. 4 illustrates a flowchart of a method for intelligent audio rendering using heterogenous speaker nodes according to an embodiment of the disclosure.

FIG. 4 illustrates a flowchart of a method for intelligent audio rendering using heterogenous speaker nodes according to an embodiment of the disclosure.

Referring to FIG. 4, a flowchart of method 400 for intelligent audio rendering using heterogenous speaker nodes is illustrated in accordance with an implementation of the disclosure.

At operation 402, the I/O unit (208) detects the nearby devices including the second media device (244). In an example, the source device (202) connects to the second media device (244) by a wired and/or wireless communication network.

At operation 404, the speaker capability propagation module (216) determines capabilities of the connected devices based on the information embedded in the corresponding device nodes. In an example, the speaker capability propagation module (216) determines capabilities of the second media device (244) based on information embedded in the second media device (244).

At operation 406, the speaker capability propagation module (216) detects the spatial location, i.e., the position and direction of the connected devices based on the information embedded in the corresponding device nodes. In an example, the speaker capability propagation module (216) determines the spatial location of the second media device (244).

At operation 408, the speaker profile generation module (211) generates dynamic profiles based on device connection type, position of device, and the information embedded in the corresponding device nodes. In an example, the speaker profile generation module (211) generates the speaker profiles for the speakers (254) in the second media device (244).

The speaker profile generation module (211) maps an audio channel to each speaker (254) based on the corresponding speaker profile. In an example, the speaker profile generation module (211) maps audio channels of the source device (202) to the speakers in the second media device (244).

The media propagation path estimation module (220) estimates media paths between the source device (202) and the speakers of the connected devices. In an example, the media propagation path estimation module (220) estimates the media path between the source device and the speakers (254) of the second media device (244).

At operation 410, the user and system environment change detection module (222) determines whether there is a change in device environment or whether there is a profile update.

If at operation 410, the user and system environment change detection module (222) determines that there is a change in the device environment or that there is a profile update, the source device (202) executes operation 404.

At operation 412, the source device (202) updates the node details.

At operation 414, the media renderer module (214) dynamically renders audio on the connected devices based on the respective dynamic profiles of the connected devices. In an example, the media renderer module (214) dynamically renders the audio on the second media device (244).

Figure 5:
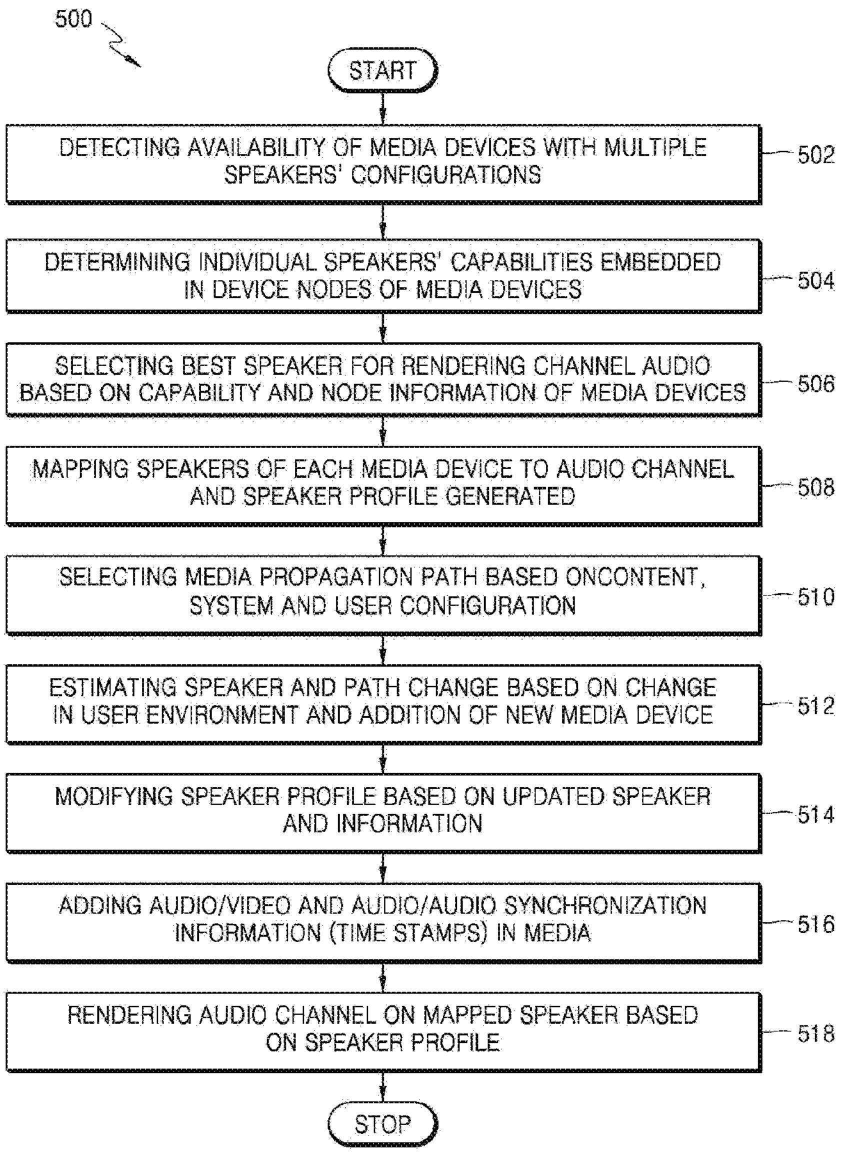
FIG. 5 illustrates a flowchart of a method for intelligent audio rendering using heterogenous speaker nodes according to an embodiment of the disclosure.

FIG. 5 illustrates a flowchart of a method for intelligent audio rendering using heterogenous speaker nodes according to an embodiment of the disclosure.

Referring to FIG. 5, a method 500 for intelligent audio rendering using heterogenous speaker nodes is illustrated in accordance with an implementation of the disclosure.

At operation 502, the source device (202) determines that media devices with different speaker configurations are available.

At operation 504, the speaker capability propagation module (216) determines the individual capacities embedded in the respective device nodes of the speakers of each media device.

At operation 506, the best speaker estimation module (218) determines and selects best speaker based on the capability and node information of the media devices for rendering channel audio.

At operation 508, the speaker profile generation module (211) maps speakers of each media device to audio channels and generates speaker profiles.

At operation 510, the media propagation path estimation module (220) selects a media propagation path based on content, system, and user configuration.

At operation 512, the user and system environment change detection module (222) estimates speaker and path change based on change in user environment and addition of new media device(s).

At operation 514, the speaker profile generation module (211) modifies the speaker profile based on the updated speaker and path information.

At operation 516, the source device (202) adds audio/video and audio/audio synchronization information and/or time stamps in the media.

At operation 518, the media renderer module (214) renders the audio channel on the mapped speaker based on the speaker profile.

Figure 6:
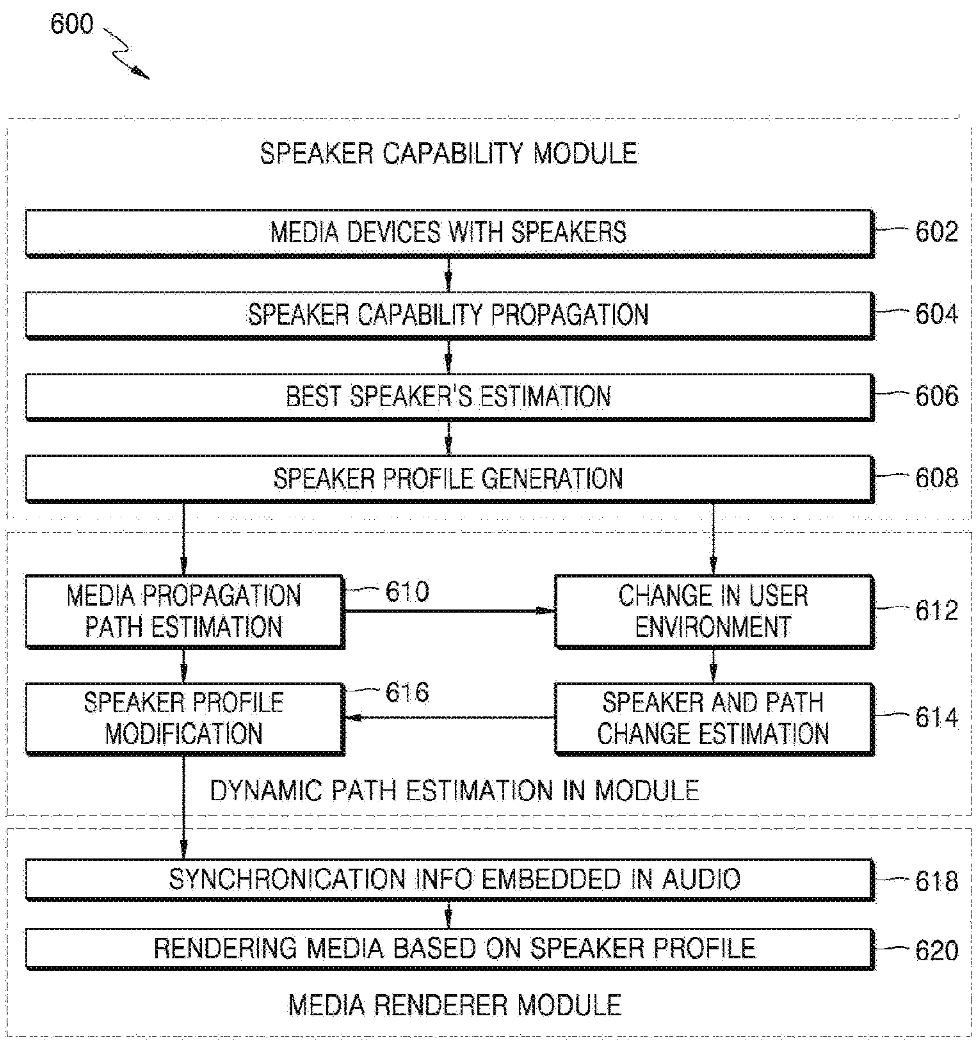
FIG. 6 illustrates a flowchart of a method for intelligent audio rendering using heterogenous speaker nodes according to an embodiment of the disclosure.

FIG. 6 illustrates a flowchart of a method for intelligent audio rendering using heterogenous speaker nodes according to an embodiment of the disclosure.

Referring to FIG. 6, a flowchart of a method 600 for intelligent audio rendering using heterogenous speaker nodes is illustrated in accordance with an implementation of the present disclosure.

At operation 602, the source device (202) determines that the media devices with different speaker configurations are available.

At operation 604, the speaker capability propagation module (216) retrieves the audio capabilities information of the connected speakers in the media devices. The source device (202) has predefined audio capability table. The information embedded in the device node can be accessible to all connected devices to know speaker capability details. In speaker capability propagation module (216), the connected devices' speaker information is retrieved from their nodes.

At operation 606, the best speaker estimation module (218) estimates the best speaker configuration based on the speaker capability, relative position from the source device (202), speaker spatial position in the media device and strength of the connection in case of wireless mode. The best speaker estimation module (218) selects the speakers for each audio channel based on these static and dynamic parameters.

At operation 608, the speaker profile generation module (211) assigns audio channel to each speaker and generates speaker profiles. The channel assignment uses the speakers with best capability to render the real channel either on the source device (202) or on a remote audio node device (such as sound bar, speaker etc.) and position with respect to source device (202). The channel assignment is fixed and does not change on runtime unless a profile change is required.

At operation 610, the dynamic media path estimation module (212) estimates media path from source device to speaker. The dynamic media path estimation module (212) estimates audio path based on speaker profile using bandwidth requirement, quality of service (QoS) and available connected medium of device.

At operation 612, the user and system environment change detection and profile generation module (222) detects changes in user environment.

At operation 614, the user and system environment change detection and profile generation module (222) estimates speaker and path changes. The media path also changes based on user environment change or device location changes.

At operation 616, the speaker profile generation module (211) modifies the speaker profiles based on the detected changes.

At operation 618, the source device (202) adds audio/video and audio/audio synchronization information and/or time stamps in the media.

At operation 620, the media renderer module (214) retrieves the media and speaker profile information. Based on the speaker profile and available speaker nodes, the media renderer module (214) renders channel audio as per speaker profile.

Figure 7:
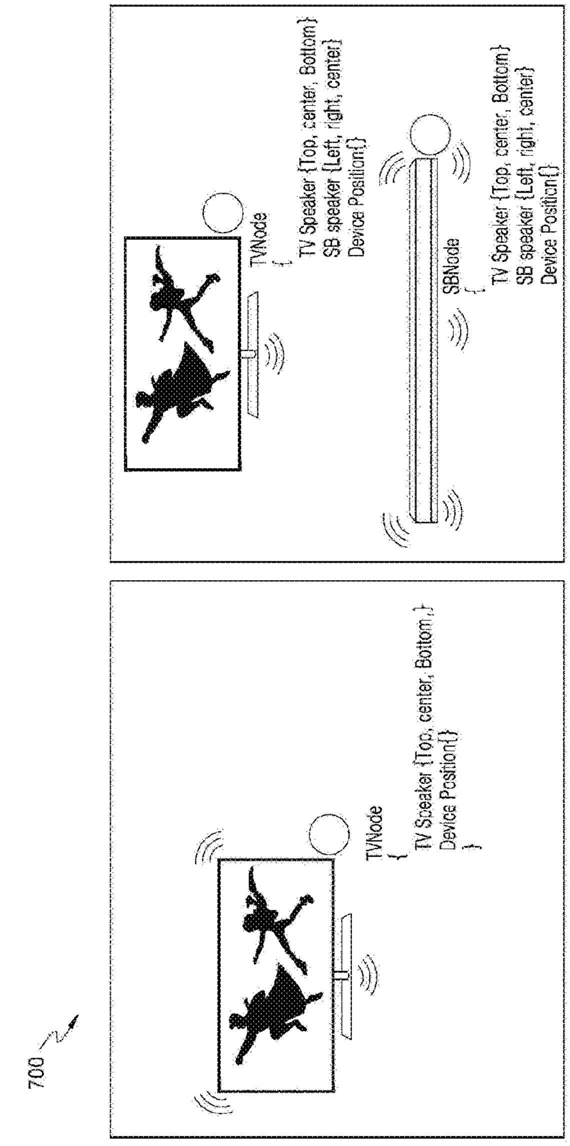
FIG. 7 illustrates speaker capability propagation according to an embodiment of the disclosure.

FIG. 7 illustrates speaker capability propagation according to an embodiment of the disclosure.

Referring to FIG. 7, the speaker capability propagation 700 is illustrated in accordance with an implementation of the disclosure.

The source device (202) retrieves the audio capability (speaker configuration or speaker capability) information of the connected audio nodes. The speaker capability information includes (i) number of speakers, (ii) speaker frequency response, (iii) speaker spatial position (L/C/R/Ls/Rs/Top/Side/Tweeter/Woofer), (iv) RSSI value of device, (v) post processing capability, and (vi) post processing delay. The speaker capability information may also be referred to as node information or speaker node capability. This information is exchanged using Consumer Electronics Control (CEC) for HDMI Audio Return Channel (ARC) and Network Layer 3 protocol for Wi-Fi Audio. The source device audio node has audio capability details. This information is embedded into the device node which can be accessed by any device connected in the same environment.

FIG. 7 illustrates the speaker details embedded into TV and sound bar. The capability information is exchanged using: (i) CEC for HDMI ARC/enhanced ARC (eARC) Audio, (ii) Network Layer 3 protocol for Wi-Fi Audio, and (iii) BT Serial Port Profile (SPP) Socket connection for Blue Tooth/Optical Audio.

The source device (202) has predefined audio capability tables. The audio table maps speaker capability to channel assignment in audio quality setting database.

Figure 8:
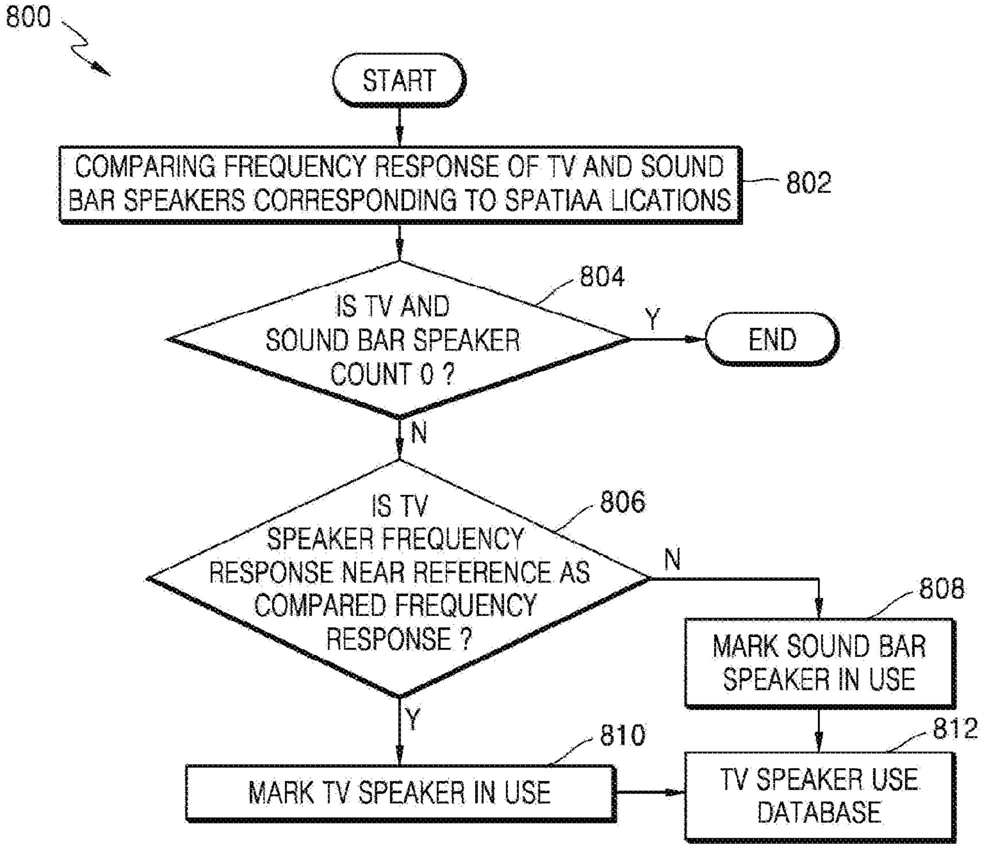
FIG. 8 illustrates a flowchart of a method for speaker profile generation according to an embodiment of the disclosure.

FIG. 8 illustrates a flowchart of a method for speaker profile generation according to an embodiment of the disclosure.

Referring to FIG. 8, a flowchart of a method 800 for speaker profile generation is illustrated in accordance with an implementation of the disclosure.

The channel assignment uses the speakers with best capability to render the real channel either on the source device (202) or audio node device such as the sound bar (244) or other speakers and position with respect to the source device (202). The channel assignment is fixed and does not change on runtime unless a speaker profile change is required i.e., change in device position or environment, or change in device itself. The information is exchanged on HDMI hot plug and/or Wi-Fi when the sound bar (244) is connected to the TV (202) by Wi-Fi audio connection. The information is exchanged in advance of the start of operation by the user (selecting the use of the TV and audio receiver device sound bar) speakers at the same time). The TV (202) and the audio receiver device i.e., the sound bar (244) extract the same audio stream channel information embedded in audio frame and independently use the routing table to render audio on predefined speakers on both: the TV (202) and the audio receiver device i.e., the sound bar (244).

At operation 802, the frequency responses of the speakers of the TV (202) and the sound bar (244) corresponding to the spatial locations are compared.

At operation 804, the speaker and sound bar count is checked.

At operation 806, the TV speaker frequency response near reference is compared with sound bar frequency response.

At operation 808, the sound bar speaker is marked in use.

At operation 810, the TV speaker is marked in use.

At operation 812, the TV speaker use database is updated.

In an example, the TV (202) compares the frequency response of the speakers (232) of the TV (202) and the frequency response of the speakers (254) of the sound bar (244) with a reference frequency of the audio. The TV (202) selects the speaker (232) when the frequency response of the speaker (232) is nearer to the reference frequency. The TV (202) selects the speaker (254) when the frequency response of the speaker (254) is nearer to the reference frequency.

Figure 9:
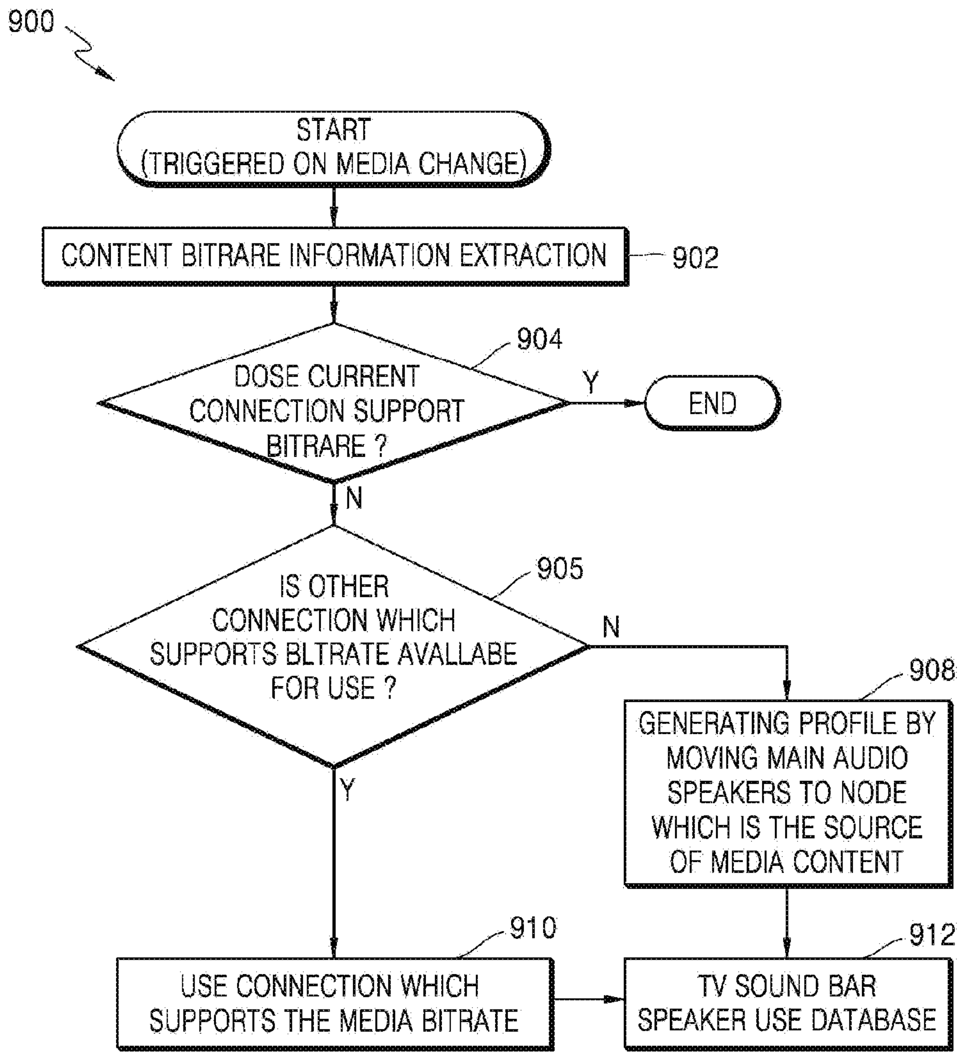
FIG. 9 illustrates a flowchart of a method for dynamic media path estimation according to an embodiment of the disclosure.

FIG. 9 illustrates a flowchart of a method for dynamic media path estimation according to an embodiment of the disclosure.

Referring to FIG. 9, a flowchart of a method 900 for dynamic media path estimation is illustrated in accordance with an implementation of the disclosure.

Once the controller module generates the profile, the first connection (ARC/eARC/Wi-Fi/BT/Optical) is started using the profile generated by the controller module. The controller module may be invoked again if below conditions arise: (i) present connection has band width limitation for media content bitrate which is being played. (Optical/ARC BT/Wi-Fi/eARC), (ii) present connection has low audio QoS due to interference/network. (BT/Wi-Fi), (iii) user selection of sound mode which enabled post processing, the profile can be generated based on post processing capability and post processing delay of the node (in this case: the TV (202) and the audio receiver are the nodes), and (iv) if the RSSI value (position) of the device changes. The dynamically created profile is applied on the TV (202) and the sound bar (244) or audio receiver on any media discontinuity.

All the audio connection media have different bandwidth capabilities. For example, eARC can carry audio data at the rates up to 37 Mbps (PCM) and 24 Mbps (uncompressed). Other mediums (Optical/ARC/Wi-Fi) do not support very high audio data rates. The data rates supported by these media cannot support very high audio bitrates. The Wi-Fi medium can support only up to 1 Mbps audio data rate. So, a need arises to change the audio connection medium if the source is receiving audio data at the rates which is/are not supported by the user selected audio connection medium. So, the source continuously checks for the audio content bitrate on every change in audio stream. If the bitrate is found to be not supported by the current audio connection medium, the audio connection is changed to the medium which supports the bitrate.

The Wi-Fi audio connection is an exception as the QoS depends on the Wi-Fi environment and the bandwidth availability to transmit the audio. The audio QoS will change when: (1) more devices are connected on the same network, or (2) more devices are operating in the same frequency band. In this situation, the audio transmission medium can be changed from Wi-Fi to other mediums which are not susceptible to the user environment. This method is chosen if there is no provision of reducing the number of devices connected with the audio source device.

At operation 902, the content bitrate information is extracted.

At operation 904, it is determined whether the content connection support bitrates.

If at operation 904, it is determined that the connection does not support bitrate, operation 906 is executed.

At operation 906, it is determined whether the other connection which supports bitrate available for use.

At operation 908, a profile is generated by moving main audio speakers to node which is the source of media content.

At operation 910, the connection that supports the bitrate is used.

At operation 912, the TV/sound bar speaker use database is used.

In an example, the user and system environment change detection module (222) detects the change in the bitrate of the audio. The dynamic media path estimation module (212) extracts new bitrate of the audio. The dynamic media path estimation module (212) determines whether the speaker mapped to the audio supports the new bitrate of the audio. Upon detecting that the speaker mapped to the audio does not support the new bitrate, the dynamic media path estimation module (212) searches for a speaker that supports the new bitrate. The media renderer module (214) dynamically renders the audio to the speaker that supports the new bitrate.

Figure 10:
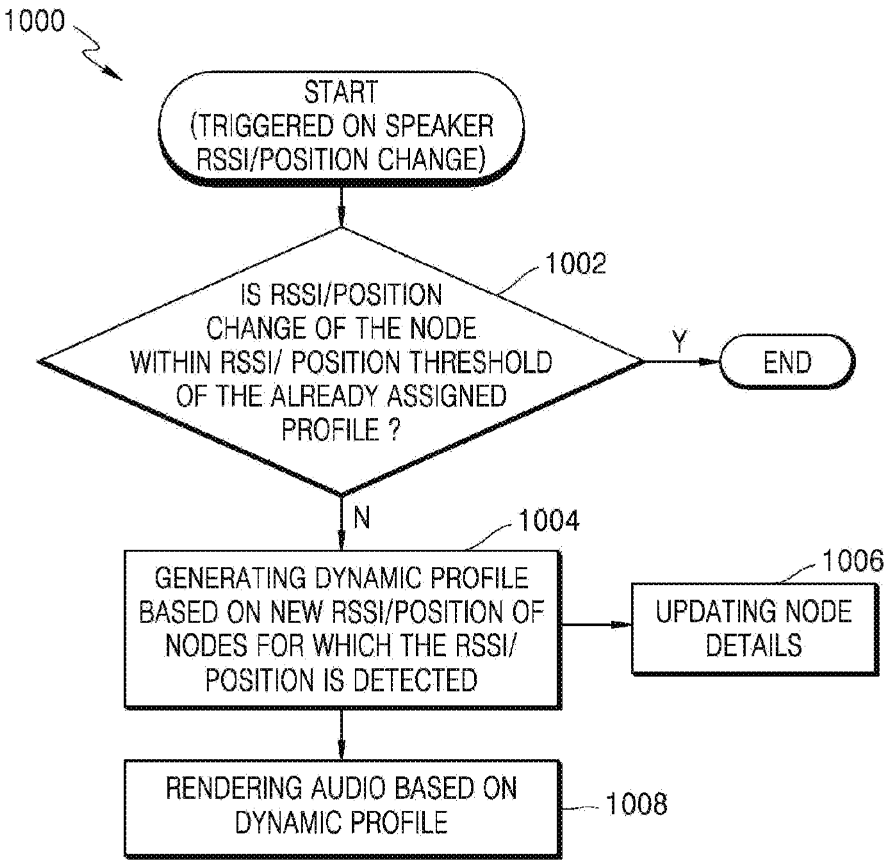
FIG. 10 illustrates a flowchart of a method for dynamic media path estimation according to an embodiment of the disclosure.

FIG. 10 illustrates a flowchart of a method for dynamic media path estimation according to an embodiment of the disclosure.

Referring to FIG. 10, a flowchart of a method 1000 for dynamic media path estimation is illustrated in accordance with an implementation of the disclosure.

The device RS SI is used to locate the distance and position of the receiver device with respect to the source device (202). Since the RSSI level is a part of the receiver device node, any change in the RSSI value can be detected by the source device (202). The position change provides following information to the source device (202): (i) the device is being more far from the source device (202), and/or (ii) the device position is changed and the distance from the source device (202) is same. This means that the receiver device may be used to render a different audio channel.

At operation 1002, it is checked if the RSSI/position change of the node is within RSSI/position threshold of the preassigned profile.

At operation 1004, the dynamic profile is generated based on new RSSI/position of nodes for which the RSSI/position is detected.

At operation 1006, the node details are updated.

At operation 1008, the audio is rendered based on dynamic profile.

Figure 11A:
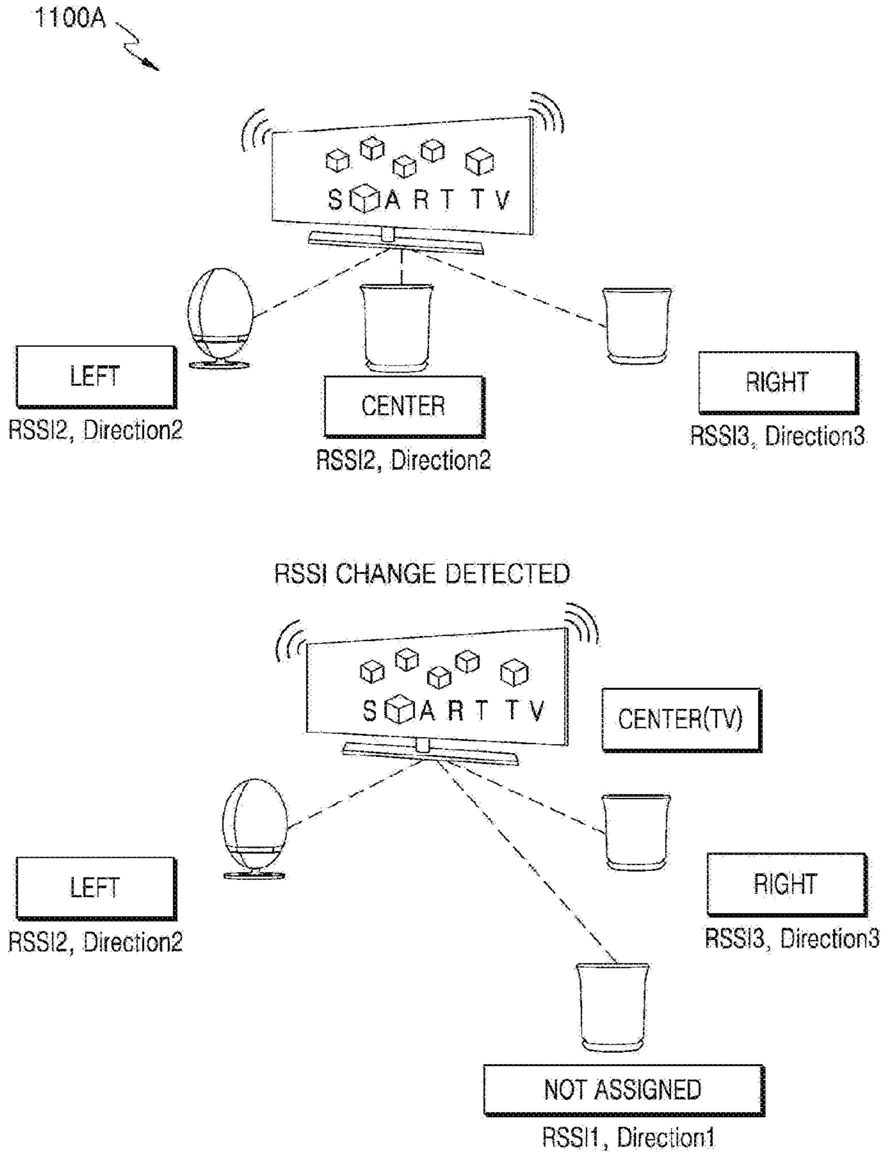
FIG. 11A illustrates detection of RSSI change according to an embodiment of the disclosure.

FIG. 11A illustrates detection of RSSI change according to an embodiment of the disclosure.

Referring to FIG. 11A, detection of RSSI change is illustrated in accordance with an implementation of the disclosure.

For example, system 1100A may include a left speaker (RSS12, Direction 2), a center speaker (RSSI1, Direction 1), and a right speaker (RSSI3, Direction 3). After an RSSI change is detected (e.g., a change in RSSI is detected indicating a change in location or orientation of at least one speaker), the system 1100A may redetermine a profile of each speaker. For instance, as illustrated in FIG. 11A, the left speaker and the right speaker may remain unchanged, a previously unassigned speaker may be added (RSSI1, Direction 1), and a speaker associated with the TV may be identified as the center speaker. The changes may be based on a learning-based audio path prediction and/or dynamic profile generation.

The learning-based audio path prediction and dynamic profile generation is described below.

The model used in selection of a speaker may include: (a) capability and position-based speaker profile generation, and (b) environment based speaker profile generation.

$$\beta = \frac{\text{Estimated Bandwidth required for Audio}}{\text{Total Available Bandwidth}} \tag{1.1}$$

$$\beta = a(m)/A$$

β is the bandwidth ratio.

$$n = n(\max) + \frac{a(m) * \left(1 - \frac{1}{\beta}\right)}{(\text{Frame Rate} * m)} \tag{1.2}$$

-continued $$n = n(\max) + \left(1 - \frac{1}{\beta}\right)$$

n is the frame count which needs to be buffered for providing desired QoS, in this case buffering required to avoid Audio drops.

n(max) the maximum frame count which can be buffered to meet lip sync specification. This can be pre-determined by the lip sync specification.

If calculated n>n(max), then the number of speakers m needs to be reduced.

Since n cannot be greater than n(max), (1.2) can be calculated as Buffer ratio (μ) on the Speaker.

$$\mu = \frac{Qa(t)}{Qe} \quad (1.3)$$

Qa(t) is the actual Queue at time t.

Qe is the predetermined Expected Queue, theoretically same as n(max).

Figure 11B:
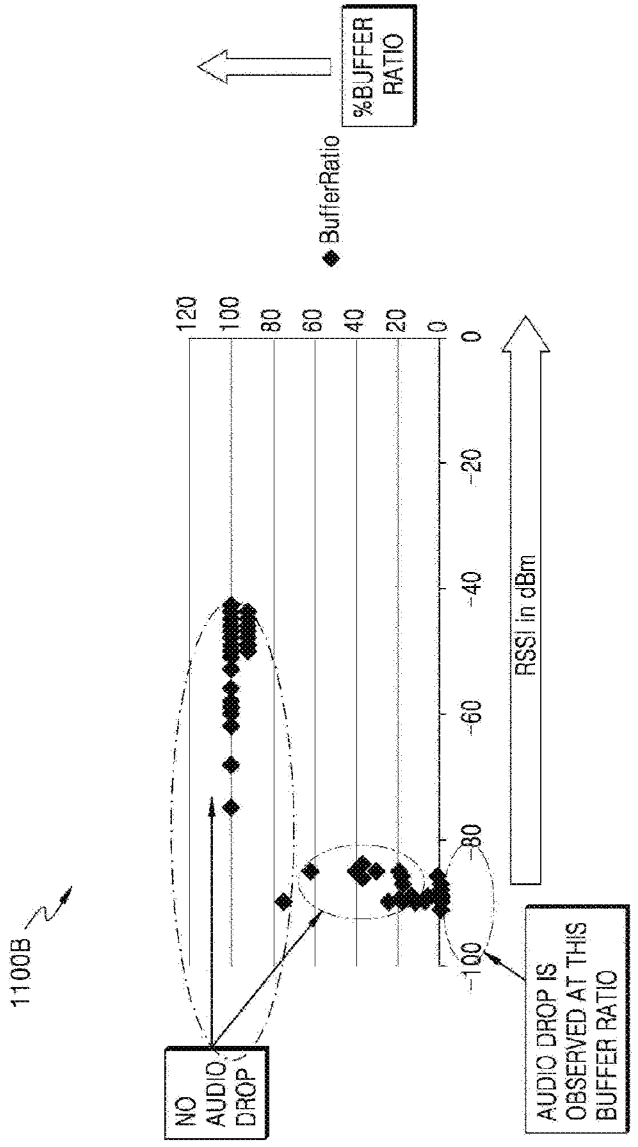
FIG. 11B illustrates change in speaker location based on each speaker buffer ratio according to an embodiment of the disclosure.

Referring to FIG. 11B, no audio drop is observed if $\mu>0.1$.

FIG. 11B shows a graph 1100B illustrating a relationship between a detected RSSI and a change in buffer ratio according to an embodiment of the disclosure. A change in speaker location may be based on each speaker buffer ratio. Once the buffer ratio improves, it changes location to best Wi-Fi speaker.

FIG. 11C shows an experimental result 1100 for dynamic media path estimation according to an embodiment of the disclosure.

In an example, the user and system environment change detection module (222) detects the change in spatial location of the speaker. The dynamic media path estimation module (212) determines whether a Received Signal Strength Indicator (RSSI) value of the speaker is within a predefined threshold RSSI value. The speaker profile generation module (211) updates the speaker profile of the speaker upon detecting that the RSSI value of the speaker is not within the predefined threshold RSSI value. The media renderer module (214) dynamically renders the audio to the speaker based on the updated speaker profile.

Figure 12:
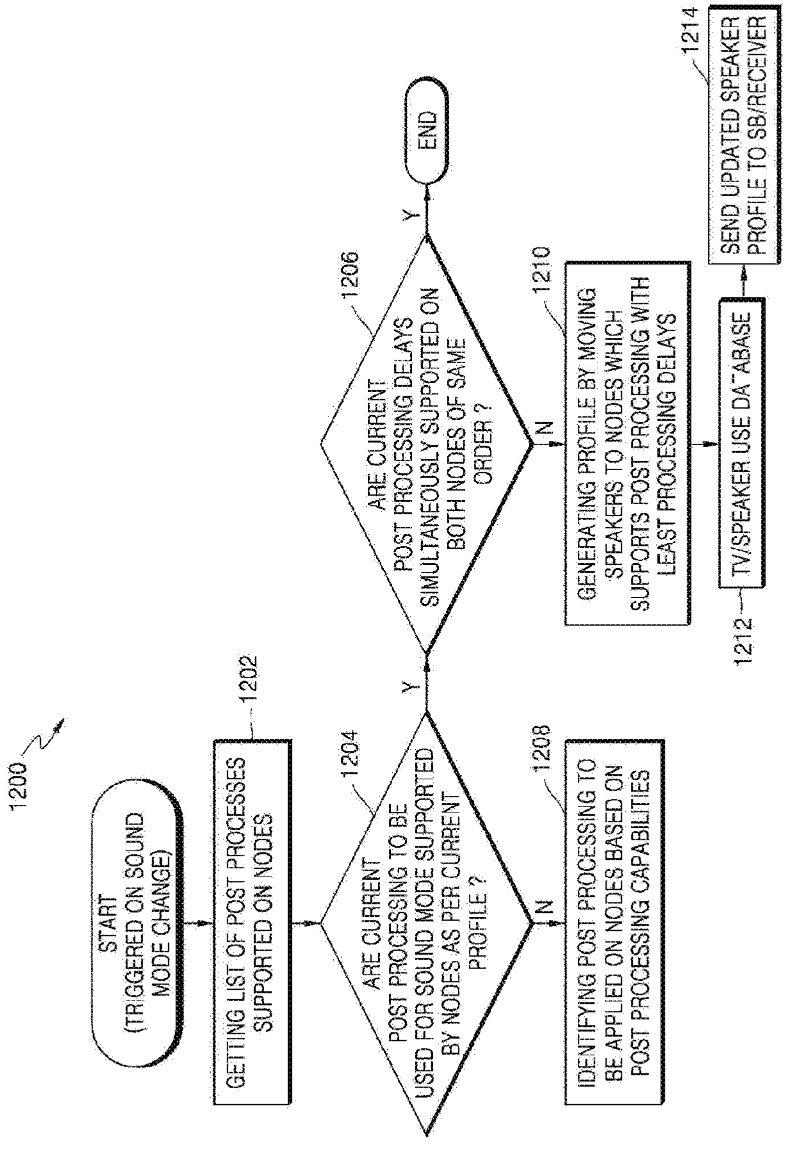
FIG. 12 illustrates a flowchart of a method for media rendering according to an embodiment of the disclosure.

FIG. 12 illustrates a flowchart of a method for media rendering according to an embodiment of the disclosure.

Referring to FIG. 12, a flowchart of a method 1200 for media rendering is illustrated in accordance with an implementation of the disclosure.

At operation 1202, upon triggering on sound mode change, the source device (202) determines a list of post processes supported on nodes.

At operation 1204, the source device (202) determines whether the current post processing to be used for sound mode is supported by nodes as per current profile. If yes, operation 1206 is executed. If not, operation 1208 is executed.

At operation 1208, the source device (202) identifies post processing to be applied on nodes based on post processing capabilities.

At operation 1206, the source device (202) determines whether current post processing delays are simultaneously supported on both nodes of same order. If not, operation 1210 is executed.

At operation 1210, the source device (202) generates speaker profile by moving speakers to nodes which support post processing with least processing delays.

At operation 1212, the source device (202) accesses the TV/speaker use database.

At operation 1214, the source device (202) sends the updated speaker profile to the second media device (244).

The source device (202) and the receiver device have different performances in terms of processing audio data. The performance is measured in terms of time consumed to transform input to preferred output. When it comes to multimedia involving video and audio, audio video lip sync (AV sync) must be maintained within the limits For example, if the processing delay on the receiver is greater than the AV sync threshold limits, then the receiver cannot be used for rendering the audio. Most time-consuming transformation in an audio pipeline is the post processing delays. The receiver post processing delays are checked regularly by the source device (202), and if found that the post processing delay is not suitable for AV sync thresholds, then the receiver may be taken off the rendering system and the source device (202) can add its own speaker in the system.

Figure 13:
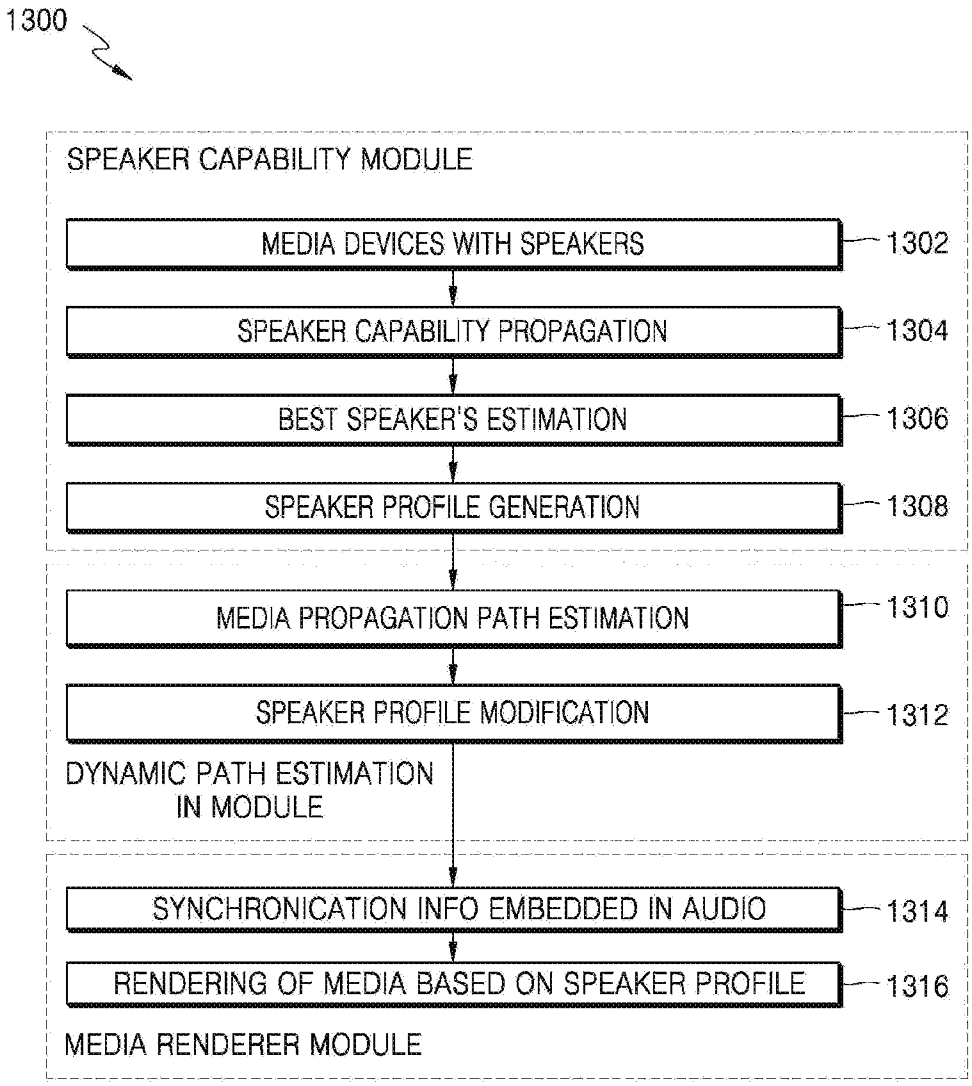
FIG. 13 illustrates a flowchart of a method for media propagation and path estimation according to an embodiment of the disclosure.

FIG. 13 illustrates a flowchart of a method for media propagation and path estimation according to an embodiment of the disclosure.

Referring to FIG. 13, a flowchart of a method 1300 for media propagation and path estimation is illustrated in accordance with an implementation of the disclosure.

At operation 1302, media devices with speakers are searched.

At operation 1304, speaker capabilities of the speakers are determined.

At operation 1306, best speaker is estimated.

At operation 1308, a speaker profile is generated.

At operation 1310, a media propagation path is estimated.

At operation 1312, the speaker profile is modified.

At operation 1314, synchronization information is embedded in the audio.

At operation 1316, sound is rendered on the speakers based on the respective speaker profiles.

Figure 14:
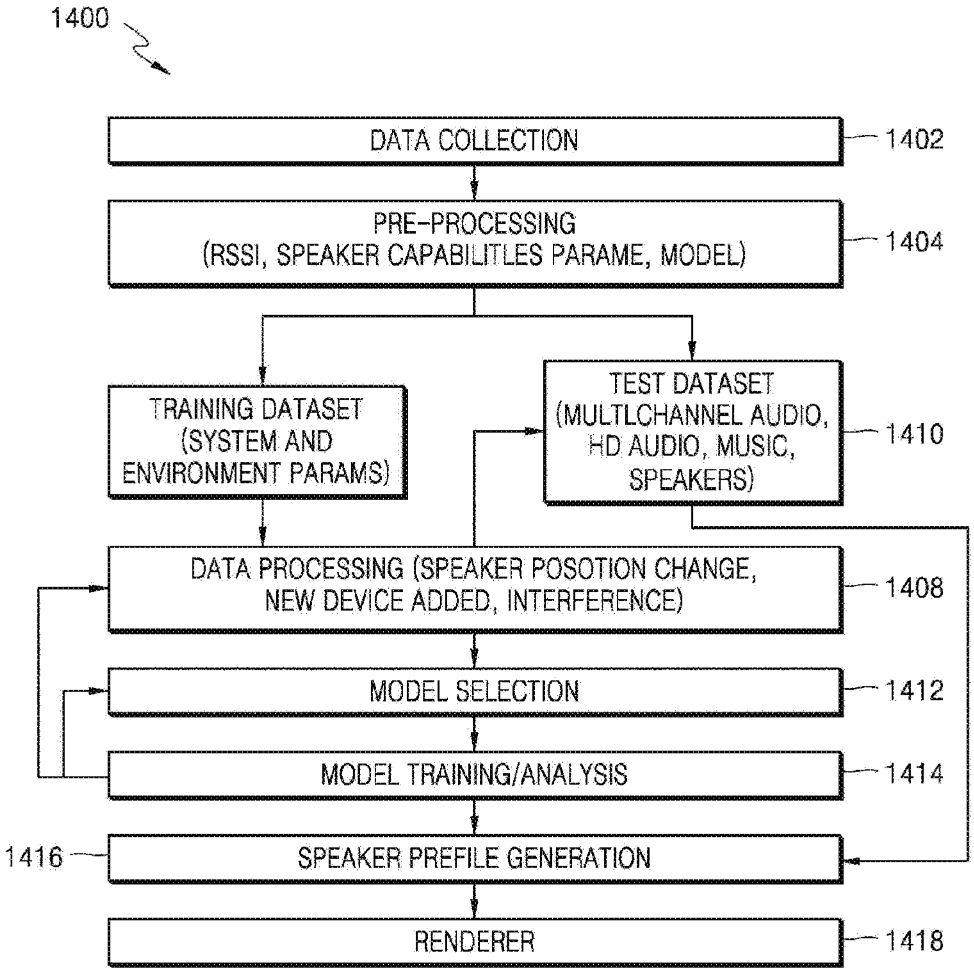
FIG. 14 illustrates a flowchart of a method for speaker profile generation according to an embodiment of the disclosure.

FIG. 14 illustrates a flowchart of a method for speaker profile generation according to an embodiment of the disclosure.

Referring to FIG. 14, a flowchart of a method 1400 for speaker profile generation is illustrated in accordance with an implementation of the disclosure.

At operation 1402, data is collected.

At operation 1404, pre-processing is performed to determine RSSI, speaker capabilities parameters, model etc.

At operation 1406, the training dataset is generated, including system and environment parameters.

At operation 1408, the data is processed to detect change in speaker position, addition of new device(s), interference etc.

At operation 1410, the testing dataset is generated, including multi-channel audio, High Definition (HD) audio, music, speakers etc.

At operation 1412, a model is selected.

At operation 1414, the model is trained and analyzed.

At operation 1416, the speaker profiles are generated.

At operation 1418, the sound is rendered.

Figure 15:
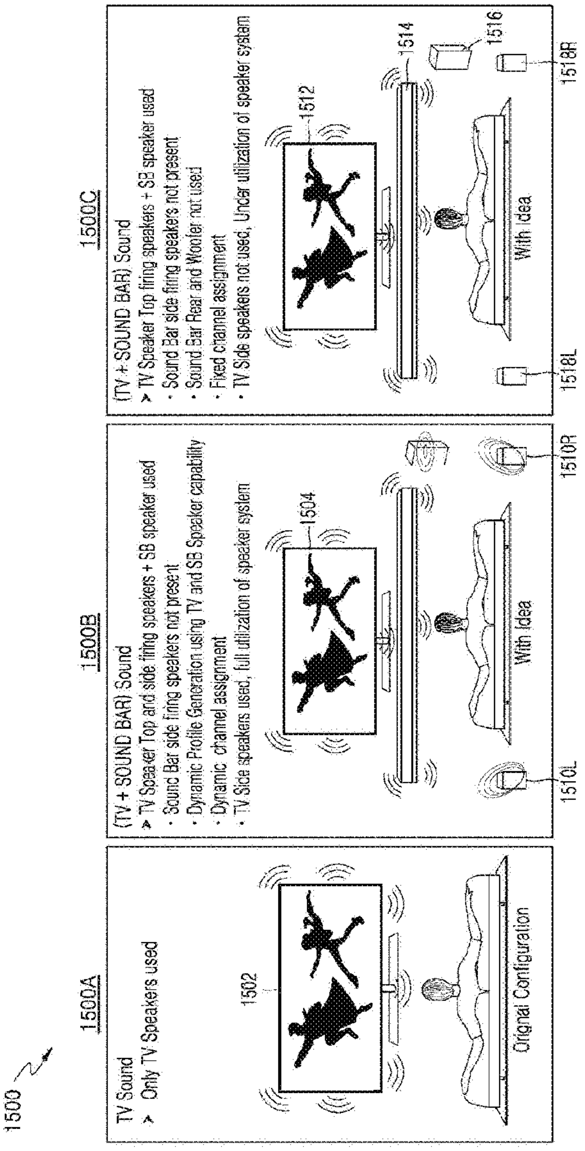
FIG. 15 illustrates a use scenario of the media system of the disclosure in comparison with a media system of the related art according to an embodiment of the disclosure.

FIG. 15 illustrates a use scenario of the media system of the disclosure in comparison with a media system of the related art according to an embodiment of the disclosure.

Referring to FIG. 15, a use scenario of the media system (1500) of the disclosure in comparison with media system is depicted according to the related art.

In 1500A, i.e., original configuration, TV speakers (1502) provide sound.

In 1500B, only top speakers and side firing speakers of TV speakers (1504) along with sound bar speakers (1506 and 1510L-1510R) are used. The sound bar does not have side firing speakers. The dynamic speaker profiles are generated for the TV speakers (1504), speaker 1508, and the sound bar speakers (1506 and 1510L-1510R) based on the respective speaker capabilities. The audio channel is dynamically assigned based on the speaker profiles. The TV side speakers are used, and full utilization of the speaker system is achieved.

In 1500C, top firing speakers of TV speakers (1512) are used along with sound bar speakers (1514). The sound bar does not have side firing speakers. The sound bar rear speakers (1518L-1518R) are not used. The sound bar woofer (1516) is not used. TV side speakers are not used, and hence, there is under-utilization of the speaker system.

FIG. 16 illustrates a first use case of the media system according to an embodiment of the disclosure.

Referring to FIG. 16, a first use case of the media system (1600) is illustrated in accordance with an implementation of the disclosure. The media system (1600) includes a TV (1602) and a sound bar (1604).

In 1600A, the user is watching media on the TV and the sound is played only on the sound bar (1604). Hence, the audio channels are mapped statically on the sound bar (1604).

In 1600B, the speaker profiles of the TV (1602) and the sound bar (1604) are generated. The audio channel is mapped dynamically on the TV (1602) and the sound bar (1604) based on the speaker profiles.

FIG. 17 illustrates a second use case of the media system according to an embodiment of the disclosure.

Referring to FIG. 17, a second use case of the media system (1700) is illustrated in accordance with an implementation of the disclosure. The media system (1700) includes a TV having TV speakers (1702) and an external woofer (1704).

In 1700A, the user is watching media on the TV. In one case, only an inbuilt woofer in the TV is used and the external woofer (1704) is not used. In other case, the sound is played on both: the TV speakers (1702) and the woofer (1704). In this case, the audio channel is mapped on both: the TV speakers (1702) and the external woofer (1704).

In 1700B, the TV detects that the capability of the external woofer (1704) is higher than the inbuilt woofer in the TV. The TV maps the audio channel to the TV speakers (1702) and the external woofer (1704) based on their respective capabilities.

Therefore, the audio channel mapping in the media system (1700) is based on the device capabilities, which utilizes the device capabilities to the fullest and provides better sound experience to the user.

FIG. 18 illustrates a third use case of the media system according to an embodiment of the disclosure.

Referring to FIG. 18, a third use case of the media system (1800) is illustrated in accordance with an implementation of the disclosure. In the third use case, the media system (1800) includes a TV having TV speakers (1802), a sound bar having sound bar speakers (1804), a woofer (1806), and Left-Right rear speakers (1808L and 1808R). The TV, the soundbar, and the speakers are connected by way of a Wi-Fi network.

In 1800A, the user is watching the media on the TV and the sound is played on the TV speakers (1802), the sound bar speakers (1804), and the rear speakers (1808L and 1808R). The Wi-Fi network is good, and the sound played by the TV speakers (1802), the sound bar speakers (1804), and the rear speakers (1808L and 1808R) matches the audio content capability.

In 1800B, the Wi-Fi network experiences congestion which results into audio drop on the left and right rear speakers (1808L and 1808R). To reduce this congestion, the TV drops the rear speakers (1808L and 1808R) from the speaker configuration. The sound configured to be played on the rear speakers (1808L and 1808R) is then dynamically routed and played on the TV speakers (1802).

Therefore, in the media system (1800), optimal and efficient sound experience is maintained even during congestions in the Wi-Fi network.

The media system of the disclosure presents a solution which provides dynamic speaker profile generation based on heterogeneous speakers and intelligent rending of audio channel using device position and capability to provide immersive experience.

Advantageously, the media system of the disclosure provides immersive sound using existing TV and sound bar speakers. The media system of the disclosure provides efficient utilization of channel and TV and sound bar speakers. In the media system of the disclosure, there is no audio degradation during poor connectivity.

In an embodiment of the disclosure, the processor (204), the speaker capability module (210), the speaker profile generation module (211), the dynamic medial path estimation module (212), and the media renderer module (214) may be implemented as at least one hardware processor or combined into the processor (204).

While the disclosure has been shown and described with reference to various embodiments thereof, it will be understood by those skilled in the art that various changes in form and details may be made therein without departing from the spirit and scope of the disclosure as defined by the appended claims and their equivalents.

We claim:

1. A method for rendering audio by a source device connected to one or more media devices, the method comprising:

determining, by at least one processor, a spatial location and speaker capability of one or more speakers in each of the one or more media devices based on information embedded in a corresponding node of the each of the one or more media devices;

selecting, by the at least one processor, a first speaker most suitable for each audio channel based on the speaker capability and the spatial location of each of the one or more speakers;

generating, by the at least one processor, speaker profiles for the one or more speakers;

mapping, by the at least one processor, an audio channel to each of the one or more speakers based on a speaker profile corresponding to each of the one or more speakers;

estimating, by the at least one processor, a media path between the source device and each of the one or more speakers based on changes in user environment or abnormalities among the one more speakers;

detecting, by the at least one processor, a change in the estimated media path; and rendering, by the at least one processor, an audio on the one or more speakers based on the speaker profiles, the changes in the media paths corresponding to each of the one or more speakers in real-time, and frequency responses of each of the one or more speakers.

2. The method of claim 1, wherein the node of the media device is accessible to the source device and other media devices connected in a network environment.

3. The method of claim 1, wherein the generating of the speaker profiles by the at least one processor comprises:
comparing a frequency response of a speaker of the source device and a frequency response of a speaker of the media device with a reference frequency of the audio,
selecting the speaker of the source device when the frequency response of the speaker of the source device is nearer to the reference frequency of the audio than the frequency response of the speaker of the media device, and
selecting the speaker of the media device when the frequency response of the speaker of the media device is nearer to the reference frequency of the audio that the frequency response of the speaker of the source device.

4. The method of claim 1, further comprising:
detecting, by the at least one processor, a change of bitrate of the audio;
extracting, by the at least one processor, a new bitrate of the audio based on the change of the bitrate of the audio;
determining, by the at least one processor, whether the speaker mapped to the audio supports the new bitrate of the audio;
searching, by the at least one processor, for a speaker that supports the new bitrate upon detecting that the speaker mapped to the audio does not support the new bitrate; and
rendering the audio, by the at least one processor, to the speaker that supports the new bitrate.

5. The method of claim 1, further comprising:
detecting, by the at least one processor, a change in spatial location of a speaker;
determining, by the at least one processor, whether a Received Signal Strength Indicator (RSSI) value of the speaker is within a predefined threshold RSSI value;
updating, by the at least one processor, the speaker profile of the speaker upon detecting that the RSSI value of the speaker is not within the predefined threshold RSSI value; and
rendering the audio, by the at least one processor, to the speaker based on the updated speaker profile.

6. The method of claim 1, further comprising:
retrieving, by the at least one processor, a list of post processes supported by the one or more media devices, upon detecting a change in a sound mode of the source device;
determining, by the at least one processor, whether current post processes are supported by the one or more media devices in the sound mode;
determining, by the at least one processor, when post processing delays on the one or more media devices are of same order, upon determining that the current post processes are supported by the speakers;
identifying, by the at least one processor, the supported post processes to be applied on the one or more media devices, upon determining that the current processes are not supported by the media devices;
selecting, by the at least one processor, one or more speakers of the one or more media devices supporting the current post processes in the sound mode with least processing delays;
updating, by the at least one processor, the speaker profiles of the selected speakers; and
dynamically rendering the audio, by the at least one processor, on the selected speakers in the sound mode based on the updated speaker profiles.

7. A source device comprising:
a memory; and
at least one processor configured to:
determine spatial location and speaker capability of one or more speakers in each of media devices connected to the source device, based on information embedded in a corresponding node of the each of the media devices,
select a first speaker most suitable for each audio channel based on the speaker capability and the spatial location of each of the one or more speakers,
generate speaker profiles for the one or more speakers,
map an audio channel to each of the one or more speakers based on a speaker profile corresponding to the each of the one or more speakers,
estimate a media path between the source device and each of the one or more speakers based on changes in user environment or abnormalities among the one more speakers,
detect a change in the estimated media path, and
render an audio on the one or more speakers based on the speaker profiles, the changes in the media paths corresponding to each of the one or more speakers in real-time, and frequency responses of each of the one or more speakers.

8. The source device of claim 7, wherein the node of the media device is accessible to the source device and other media devices connected in a network environment.

9. The source device of claim 7, wherein the at least one processor is further configured to:
compare a frequency response of a speaker of the source device and a frequency response of a speaker of the media device with a reference frequency of the audio,
select the speaker of the source device when the frequency response of the speaker of the source device is nearer to the reference frequency of the audio, and
select the speaker of the media device when the frequency response of the speaker of the media device is nearer to the reference frequency of the audio.

10. The source device of claim 7, wherein the at least one processor is further configured to:
extract a new bitrate of the audio in response to a detection of a change in bitrate of the audio,
determine whether the speaker mapped to the audio supports the new bitrate of the audio,
search for a speaker that supports the new bitrate upon detecting that the speaker mapped to the audio does not support the new bitrate, and
render the audio to the speaker that supports the new bitrate.

11. The source device of claim 7,
wherein the at least one processor is further configured to:
detect a change in spatial location of a speaker,
determine whether a Received Signal Strength Indicator (RSSI) value of the speaker is within a predefined threshold RSSI value,
update the speaker profile of the speaker upon detecting that the RSSI value of the speaker is not within the predefined threshold RSSI value, and
render the audio to the speaker based on the updated speaker profile.

12. The source device of claim 7, wherein the at least one processor is further configured to:

retrieve a list of post processes supported by the media devices, upon detecting a change in a sound mode of the source device, determine whether current post processes are supported by the media devices in the sound mode, determine if post processing delays on the media devices are of same order, upon determining that the current post processes are supported by the speakers, identify the supported post processes to be applied on the media devices, upon determining that the current processes are not supported by the media devices, select one or more speakers of the media devices supporting the current post processes in the sound mode with least processing delays, update the speaker profiles of the selected speakers, and render the audio on the selected speakers in the sound mode based on the updated speaker profiles.

13. The source device of claim 7, wherein the first speaker which is the most suitable for the each audio channel is further selected based on a status of a network facilitating communication between the one or more speakers and the source device.

14. The source device of claim 13, wherein, when the status of the network facilitating communication between the one or more speakers and the source device is below a threshold, the at least one processor is further configured to identify a second speaker for the each audio channel, and wherein at least one of the one or more speakers are different when the second speaker for the each audio channel is identified.

15. The source device of claim 13, wherein the network facilitating communication between the one or more speakers and the source device is a wireless communication network.

16. One or more non-transitory computer-readable storage media storing one or more computer programs including computer-executable instructions that, when executed by one or more processors of an electronic device, cause the electronic device to perform operations, the operations comprising:

determining, by the electronic device, a spatial location and speaker capability of one or more speakers in each of one or more media devices based on information embedded in a corresponding node of the each of the one or more media devices;

selecting, by the electronic device, a first speaker most suitable for each audio channel based on the speaker capability and the spatial location of each of the one or more speakers;

generating, by the electronic device, speaker profiles for the one or more speakers based on system and user environment conditions;

mapping, by the electronic device, an audio channel to each of the one or more speakers based on a speaker profile corresponding to each of the one or more speakers;

estimating, by the electronic device, a media path between a source device and each of the one or more speakers based on changes in user environment or abnormalities among the one more speakers;

detecting, by the electronic device, a change in the estimated media path; and rendering, by the electronic device, an audio on the one or more speakers based on the speaker profiles, the changes in the media paths corresponding to each of the one or more speakers in real-time, and frequency responses of each of the one or more speakers.

17. The one or more non-transitory computer-readable storage media of claim 16, wherein the operations further comprising:

detecting, by the electronic device, a change of bitrate of the audio;

extracting, by the electronic device, a new bitrate of the audio based on the change of the bitrate of the audio;

determining, by the electronic device, whether the speaker mapped to the audio supports the new bitrate of the audio;

searching, by the electronic device, for a speaker that supports the new bitrate upon detecting that the speaker mapped to the audio does not support the new bitrate; and rendering the audio, by the electronic device, to the speaker that supports the new bitrate.

* * * * *